(12) United States Patent
Ronne et al.

(10) Patent No.: US 10,804,690 B2
(45) Date of Patent: Oct. 13, 2020

(54) OPTICALLY COMMUNICATIVE BATTERY MANAGEMENT SYSTEM

(71) Applicant: CORVUS ENERGY INC., Richmond (CA)

(72) Inventors: Jerome Ronne, Richmond (CA); Chi-Kiu Tsang, Richmond (CA); Siu Lun Isaac Tang, Richmond (CA); David Lokhorst, Richmond (CA)

(73) Assignee: CORVUS ENERGY INC., Richmond, British Columbia (CA)

( * ) Notice: Subject to any disclaimer, the term of this patent is extended or adjusted under 35 U.S.C. 154(b) by 0 days.

(21) Appl. No.: 16/327,559

(22) PCT Filed: Aug. 23, 2017

(86) PCT No.: PCT/CA2017/050995
§ 371 (c)(1),
(2) Date: Feb. 22, 2019

(87) PCT Pub. No.: WO2018/035609
PCT Pub. Date: Mar. 1, 2018

(65) Prior Publication Data
US 2019/0229518 A1 Jul. 25, 2019

Related U.S. Application Data

(60) Provisional application No. 62/418,705, filed on Nov. 7, 2016, provisional application No. 62/378,597, filed on Aug. 23, 2016.

(51) Int. Cl.
*G08C 23/04* (2006.01)
*G04C 23/06* (2006.01)
(Continued)

(52) U.S. Cl.
CPC .......... *H02H 1/0069* (2013.01); *G08C 23/04* (2013.01); *G08C 25/00* (2013.01); *H01M 10/425* (2013.01);
(Continued)

(58) Field of Classification Search
CPC ............................. G08C 23/04; G08C 23/06; H01M 2010/4278
See application file for complete search history.

(56) References Cited

U.S. PATENT DOCUMENTS

| | | | |
|---|---|---|---|
| 2008/0180389 A1* | 7/2008 | Kelly | H04B 10/803 345/156 |
| 2013/0108898 A1* | 5/2013 | Potts | H02J 7/0013 429/50 |

(Continued)

*Primary Examiner* — Nathan M Cors
(74) *Attorney, Agent, or Firm* — Venable LLP; Michele V. Frank

(57) ABSTRACT

An optically communicative battery management system includes a pack controller and one or more module controllers optically coupled to the pack controller. The module controllers may themselves be optically coupled together in series, and communication from an upstream module controller may be relayed through one or more downstream controllers en route to the pack controller. The pack controller may also send an optical signal that is used by the pack controller to determine whether any one or more of the battery modules is experiencing a safety fault, and the communication channel used to transmit that optical signal may, absent any safety faults, be used to multiplex message data to the module controllers.

18 Claims, 17 Drawing Sheets

(51) Int. Cl.
    *H01M 10/42*     (2006.01)
    *H04B 10/50*     (2013.01)
    *H04B 10/61*     (2013.01)
    *H02H 1/00*     (2006.01)
    *H02H 7/18*     (2006.01)
    *H02H 3/06*     (2006.01)
    *H01M 10/48*     (2006.01)
    *G08C 25/00*     (2006.01)
    *H04L 5/14*     (2006.01)

(52) U.S. Cl.
    CPC ..... *H01M 10/4207* (2013.01); *H01M 10/488* (2013.01); *H02H 1/0007* (2013.01); *H02H 1/0092* (2013.01); *H02H 3/06* (2013.01); *H02H 3/063* (2013.01); *H02H 7/18* (2013.01); *H04B 10/50* (2013.01); *H04B 10/61* (2013.01); *H04L 5/14* (2013.01); *H01M 2010/4278* (2013.01)

(56) References Cited

U.S. PATENT DOCUMENTS

| | | | |
|---|---|---|---|
| 2014/0001866 A1* | 1/2014 | Abe | H02J 7/0026 307/77 |
| 2016/0269095 A1* | 9/2016 | Hirata | G06F 13/4247 |
| 2017/0279161 A1* | 9/2017 | Kamikawa | H01M 2/1016 |
| 2019/0242949 A1* | 8/2019 | Lemkin | H01M 10/425 |

\* cited by examiner

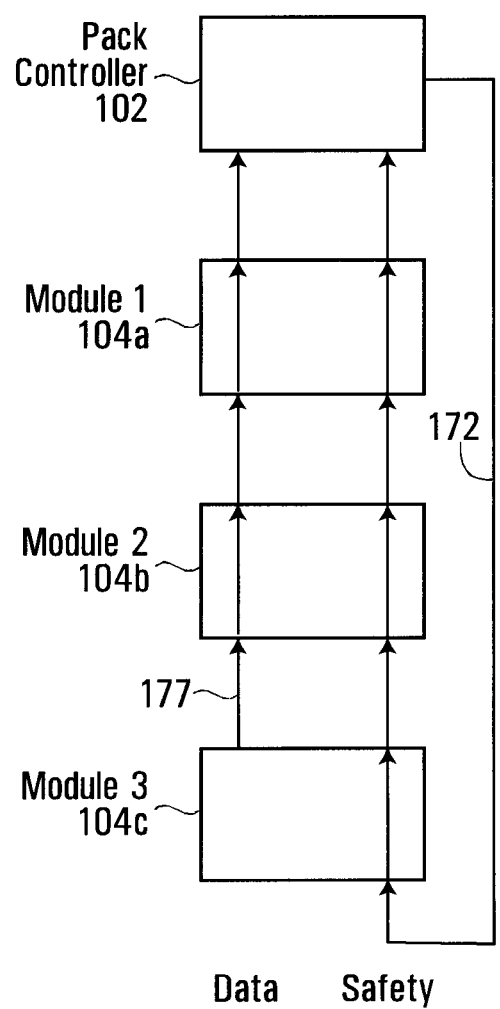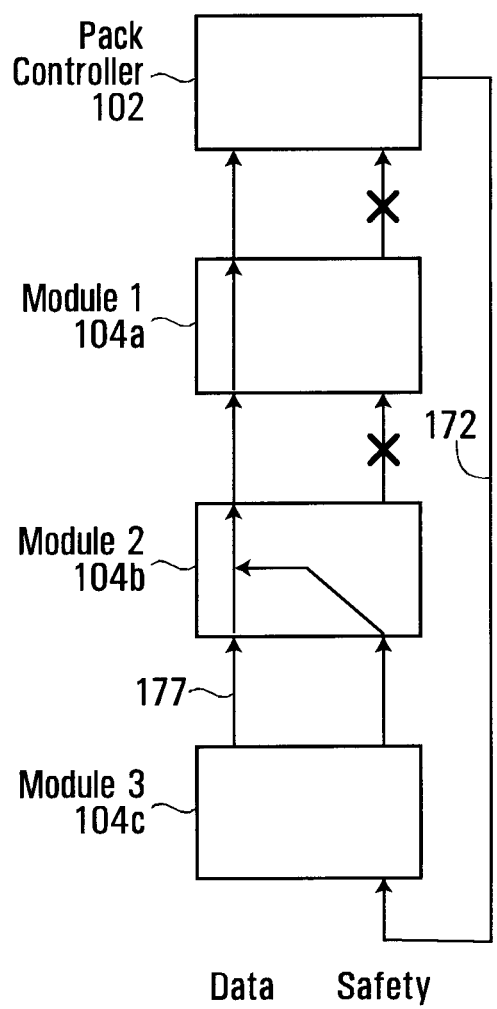
FIG. 7A
FIG. 7B

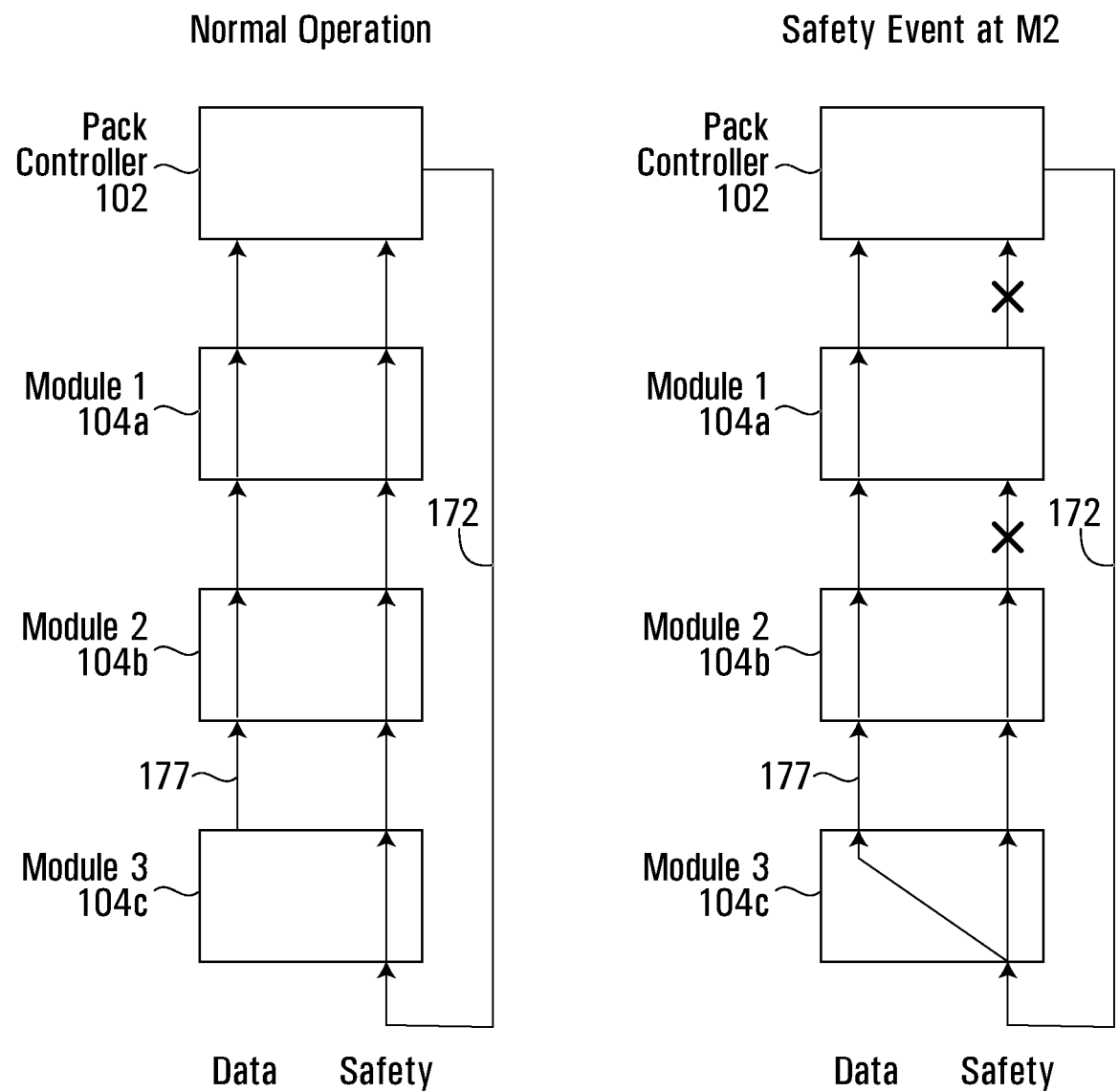

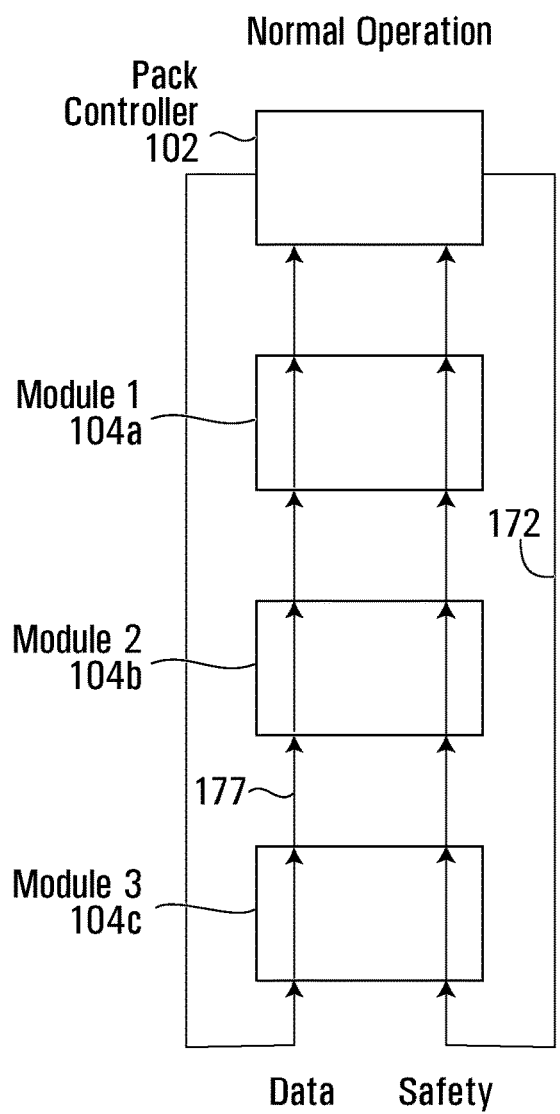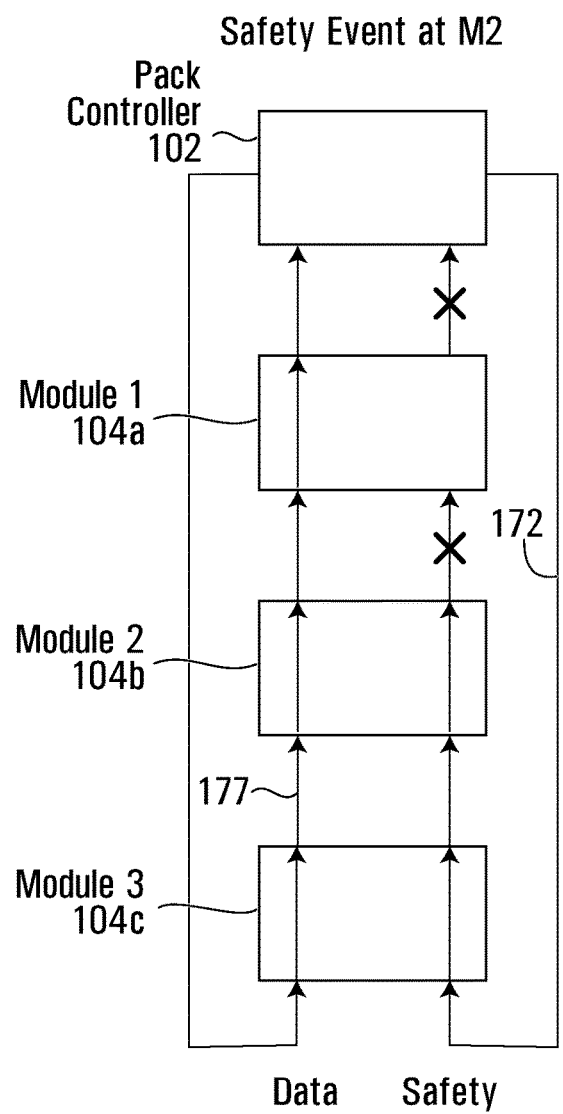
FIG. 10A
FIG. 10B

OPTICALLY COMMUNICATIVE BATTERY MANAGEMENT SYSTEM

TECHNICAL FIELD

The present disclosure is directed at an optically communicative battery management system. More particularly, the present disclosure is directed at a pack and module controller that comprise part of the battery management system and that communicate optically with each other.

BACKGROUND

Battery packs designed for industrial use are typically capable of outputting high voltage and current and comprise multiple battery modules electrically coupled together; each of the battery modules themselves comprises multiple battery cells electrically coupled together. Given the amount of power battery packs are capable of generating and the risks associated with their unsafe use, a battery pack typically comprises a battery management system to monitor and control battery parameters such as state of charge and cell temperature. Properly managing these battery parameters promotes safe battery pack operation and can help to extend the commercial life of the battery pack.

SUMMARY

According to a first aspect, there is provided a pack controller for optically communicating with a module controller that comprises part of a battery module. The pack controller comprises a first electro-optical receiver for receiving a received optical signal from the module controller and configured to convert the received optical signal into a received electrical signal; and signal processing circuitry communicatively coupled to the electro-optical receiver and configured to process the received electrical signal.

The pack controller may further comprise signal generation circuitry configured to generate a transmitted electrical signal; and a first electro-optical transmitter communicatively coupled to the signal generation circuitry to receive the transmitted electrical signal and configured to convert the transmitted electrical signal into a transmitted optical signal for transmitting to the module controller.

The signal processing and generation circuitry may comprise a pack controller processor communicatively coupled to the electro-optical receiver and transmitter; and a pack controller memory communicatively coupled to the processor, the memory having stored thereon computer program code executable by the processor to cause the processor to process the received electrical signal and to generate the transmitted electrical signal.

The received optical signal may comprise message data indicative of a state of the battery module, and the transmitted optical signal may comprise message data requesting the state of the battery module.

The computer program code may further cause the processor to communicate using half-duplex communication.

The computer program code may further cause the processor to communicate using full-duplex communication.

The electro-optical transmitter may comprise part of a first communication channel and the electro-optical receiver may comprise part of a second communication channel.

The electro-optical transmitter and receiver may comprise part of a single communication channel.

The pack controller may further comprise switchgear electrically coupling a battery cell comprising part of the battery module to a power bus. The received signal may comprise an optical safety fault signal and the electro-optical receiver may be configured to convert the optical safety fault signal received from the module controller into an electrical safety fault signal. The signal processing circuitry may comprise safety return circuitry communicatively coupled to the switchgear configured to signal the switchgear to electrically decouple the battery cell from the power bus in response to the electrical safety fault signal.

The pack controller may further comprise a safety loop signal generator configured to generate an electrical safety signal; and an electro-optical transmitter communicatively coupled to the safety loop signal generator and configured to convert the electrical safety signal to an optical safety signal for transmitting to the module controller.

The module controller may transmit the pack controller an optical resume signal after the safety fault ends, the electro-optical receiver may be configured to convert the optical resume signal into an electrical resume signal, the safety return circuitry may be further configured to signal the switchgear to electrically couple the battery cell to the power bus in response to the electrical resume signal, and the pack controller may be in a fault state while the switchgear electrically decouples the battery cell from the power bus and in a normal state while the switchgear electrically couples the battery cell to the power bus.

The optical safety signal and the optical resume signal may be identical.

The safety loop signal generator may comprise a pack controller processor communicatively coupled to the electro-optical transmitter and receiver; and a pack controller memory communicatively coupled to the processor, the memory having stored thereon computer program code executable by the processor to cause the processor to output the optical safety signal to the module controller only when the pack controller is in the fault state.

The safety return circuitry may comprise a watchdog timer and the optical safety signal may comprise a digital signal that is non-constant over a timeout period of the watchdog timer.

The pack controller may further comprise an electro-optical transceiver communicatively coupled to the processor for receiving and transmitting optical message data from and to the module controller, respectively, wherein the electro-optical transceiver may be configured to convert between electrical message data and the optical message data. When the pack controller is in the fault state, the computer program code may further cause the processor to use the electro-optical transceiver to receive and transmit the optical message data from and to the module controller by receiving and transmitting the electrical message data from and to the electro-optical transceiver, respectively.

The computer program code may further cause the processor to communicate using half-duplex communication when the pack controller is in the fault state.

The electro-optical transmitter may be configured to convert the electrical message data to the optical message data for transmission to the module controller, and when the pack controller is in the normal state, the computer program code may further cause the processor to receive and transmit the optical message data from and to the module controller using the electro-optical transceiver, respectively.

The computer program code may further cause the processor to communicate using full-duplex communication when the pack controller is in the normal state.

The pack controller may further comprise a first multiplexer communicatively coupled to the processor and to the electro-optical transmitter, wherein the computer program code may further cause the processor to signal a selection input of the first multiplexer to output the electrical message data to the electro-optical transmitter when the pack controller is in the normal state and to output the electrical safety signal to the electro-optical transmitter when the pack controller is in the fault state.

The pack controller may further comprise a second multiplexer communicatively coupled to the processor, the first multiplexer, and the electro-optical transceiver, wherein the computer program code may further cause the processor to signal a selection input of the second multiplexer to output the electrical message data to the first multiplexer when the pack controller is in the normal state and to output the electrical message data to the electro-optical transceiver when the pack controller is in the fault state.

The pack controller may further comprise a second electro-optical receiver communicatively coupled to the processor for receiving optical message data from the module controller, wherein the second electro-optical receiver may be configured to convert the optical message data into electrical message data, the first electro-optical transmitter and first electro-optical receiver may comprise part of a first communication channel, and the second electro-optical receiver may comprise part of a second communication channel.

The pack controller may further comprise a second electro-optical transmitter communicatively coupled to the processor for sending the optical message data to the module controller, wherein the second electro-optical transmitter may be configured to convert the electrical message data to the optical message data and the second electro-optical transmitter may comprise part of the second communication channel.

The computer program code may further cause the processor to communicate using simplex communication on the first and second communication channels.

When the pack controller is in the fault state, the computer program code may further cause the processor to receive and transmit the optical message data from and to the module controller using the second communication channel.

The module controller may comprise one of multiple module controllers to which the pack controller is communicatively coupled, and the computer program code may further cause the processor to determine which of the module controllers is affected by the safety fault; and command one of the module controllers upstream of the safety fault to forward the message data from the first communication channel to the second communication channel.

The computer program code may cause the processor to determine which of the module controllers is affected by the safety fault by determining which of the module controllers is unresponsive to commands that the pack controller sends; and determining that the module controllers affected by the safety fault comprise the module controllers that are unresponsive to the commands that the pack controller sends.

The computer program code may be further configured to cause the processor to signal the module controller to enter a low power mode when the switchgear is being used to electrically decouple the battery cell from the power bus and the pack controller is not in the fault state.

According to another aspect, there is provided a module controller comprising part of a battery module. The module controller comprises a first electro-optical transmitter for receiving a transmitted electrical signal and configured to convert the transmitted electrical signal into a transmitted optical signal; and signal generation circuitry communicatively coupled to the electro-optical transmitter and configured to generate the transmitted electrical signal.

The module controller may further comprise signal processing circuitry configured to process a received electrical signal; and a first electro-optical receiver for receiving a received optical signal from the pack controller and configured to convert the received optical signal into a received electrical signal for processing by the signal processing circuitry.

The signal processing and generation circuitry may comprise a module controller processor communicatively coupled to the electro-optical receiver and transmitter; and a module controller memory communicatively coupled to the processor, the memory having stored thereon computer program code executable by the processor to cause the processor to process the received electrical signal and to generate the transmitted electrical signal.

The transmitted optical signal may comprise message data indicative of a state of the battery module, and the received optical signal may comprise message data requesting the state of the battery module.

The transmitted optical signal may comprise message data indicative of a state of the battery module, and the module controller may transmit the message data absent a request from the pack controller to do so.

The computer program code may further cause the processor to communicate using half-duplex communication.

The computer program code may further cause the processor to communicate using full-duplex communication.

The electro-optical receiver may comprise part of a first communication channel and the electro-optical transmitter may comprise part of a second communication channel.

The electro-optical transmitter and receiver may comprise part of a single communication channel.

The electro-optical transmitter and receiver may comprise a downstream electro-optical transceiver, and the module controller may further comprise an upstream electro-optical transceiver communicatively coupled to the processor for receiving the optical message data from and transmitting the optical message data to an upstream module controller, wherein the upstream electro-optical transceiver may be configured to convert between the optical message data and the electrical message data. The computer program code may further cause the processor to receive and transmit the optical message data from and to the upstream module controller by receiving and transmitting the electrical message data from and to the upstream electro-optical transceiver, respectively.

The computer program code may further cause the processor to relay the optical message data received from the upstream module controller at the upstream electro-optical transceiver to the downstream electro-optical transceiver for transmission to the pack controller.

The received signal may comprise an optical safety signal from the pack controller and the electro-optical receiver may be configured to convert the optical safety signal into an electrical safety signal; and the transmitted signal may comprise an optical safety fault signal and the electro-optical transmitter may be configured to convert an electrical safety fault signal into the optical safety fault signal. The signal generation circuitry and signal processing circuitry may comprise safety fault detection circuitry configured to generate a fault detection signal in response to detecting a safety fault on the battery module; and safety override circuitry communicatively coupled to the electro-optical receiver, electro-optical transmitter, and safety fault detection circuitry, wherein the safety override circuitry may be configured to transmit the electrical safety fault signal to the electro-optical transmitter in response to the fault detection signal.

The fault detection signal and the electrical safety fault signal may be identical.

The optical fault signal may be sent to a watchdog timer on the pack controller and may comprise a constant signal that is held constant for longer than a timeout period of the watchdog timer.

The safety fault detection circuitry may comprise a first interlock contact to which a power connector is connectable, wherein the power connector is also connected to a pair of battery contacts electrically coupled to a battery cell comprising part of the battery module when connected to the interlock contact and is unconnected to the pair of battery contacts when unconnected to the interlock contact; and an interlock signal line communicatively coupled to the interlock contact, wherein the fault detection signal is transmitted along the interlock signal line when the power connector is unconnected and is otherwise not transmitted along the interlock signal line.

The module controller may further comprise a second interlock contact to which the first interlock contact is electrically coupled when the power connector is connected and is electrically uncoupled when the power connector is unconnected, wherein the interlock signal line is pulled-up or pulled-down to the fault detection signal when the power connector is unconnected and is shorted to the second interlock contact that outputs a signal different from the fault detection signal when the power connector is connected.

The safety fault detection circuitry may further comprise at least one of a voltmeter electrically coupled across the battery cell and a thermistor positioned to measure a temperature of the battery cell, wherein the fault detection signal may be generated in response to one or more of an overvoltage condition, undervoltage condition, overtemperature condition, loss of communication with another module controller, loss of communication with the pack controller, and failure of the module controller processor.

The electro-optical transmitter may be configured to convert an electrical resume signal into an optical resume signal for transmitting to the pack controller, the safety fault detection circuitry may be further configured to cease generating the fault detection signal once the safety fault ceases, and the safety override circuitry may be further configured to transmit the electrical resume signal to the electro-optical transmitter once the fault detection signal ceases.

The optical safety signal and the optical resume signal may be identical.

The module controller may further comprise a downstream electro-optical transceiver for receiving optical message data from and transmitting the optical message data to the pack controller, wherein the downstream electro-optical transceiver may be configured to convert between the optical message data and electrical message data. The signal generation circuitry and signal processing circuitry may further comprise a module controller processor communicatively coupled to the downstream electro-optical transceiver and to the electro-optical receiver; and a module controller memory communicatively coupled to the module controller processor, the module controller memory having stored thereon computer program code executable by the module controller processor to cause the module controller processor to use, when the battery module is experiencing the safety fault, the downstream electro-optical transceiver to receive and transmit the optical message data from and to the pack controller by receiving and transmitting the electrical message data from and to the downstream electro-optical transceiver, respectively.

The module controller may further comprise an upstream electro-optical transceiver communicatively coupled to the processor for receiving the optical message data from and transmitting the optical message data to an upstream module controller, and the upstream electro-optical transceiver may be configured to convert between the optical message data and the electrical message data. The computer program code may further cause the processor, when the battery module is experiencing the safety fault, to receive and transmit the optical message data from and to the upstream module controller by receiving and transmitting the electrical message data from and to the upstream electro-optical transceiver, respectively.

The computer program code may further cause the processor to communicate using half-duplex communication when the battery module is experiencing the safety fault.

When the battery module is not experiencing the safety fault, the pack controller may transmit the optical message data to the electro-optical receiver, the electro-optical receiver may be configured to convert the optical message data into the electrical message data, and the computer program code may further cause the processor to relay the electrical message data to the downstream electro-optical transceiver.

The computer program code may further cause the processor to communicate using full-duplex communication when the battery module is not experiencing the safety fault.

The module controller may further comprise a second upstream electro-optical receiver for receiving optical message data from the pack controller, wherein the second upstream electro-optical receiver may be configured to convert the optical message data into electrical message data; a second downstream electro-optical transmitter for transmitting the optical message data to the pack controller, wherein the second downstream electro-optical receiver may be configured to convert the electrical message data into the optical message data, wherein the first upstream electro-optical receiver and first downstream electro-optical transmitter may comprise part of a first communication channel and the second upstream electro-optical receiver and second downstream electro-optical transmitter may comprise part of a second communication channel. The signal generation circuitry and signal processing circuitry may further comprise a module controller processor communicatively coupled to the second downstream electro-optical transmitter and to the second upstream electro-optical receiver; and a module controller memory communicatively coupled to the module controller processor, the module controller memory having stored thereon computer program code executable by the module controller processor to cause the processor to transmit to the second electro-optical transmitter channel responses, comprising part of the optical message data, to commands sent by the pack controller; forward the optical message data that is non-duplicative and received at the second upstream electro-optical receiver to the second downstream electro-optical transmitter; and perform the commands received from the pack controller regardless of whether the commands are received at the first or second upstream electro-optical receiver.

The computer program code may cause the processor to forward all of the optical message data received at the second upstream electro-optical receiver to the second downstream electro-optical transmitter.

The computer program code further may further cause the processor, only when the battery module is experiencing the safety fault, to forward the optical message data that is non-duplicative and received at the first upstream electro-optical receiver to the second downstream electro-optical receiver.

Alternatively, regardless of whether the battery module is experiencing the safety fault, the computer program code may further cause the processor to forward the optical message data that is non-duplicative and received at the first upstream electro-optical receiver to the second downstream electro-optical receiver.

The computer program code may further cause the processor to communicate using simplex communication regardless of whether the battery module is experiencing the safety fault.

The computer program code may be further configured to cause the processor to enter a low power mode upon not having received an optical signal for a timeout period.

The computer program code may be further configured to cause the processor to enter a low power mode upon being commanded to do so by the pack controller.

The computer program code may be further configured to cause the processor to exit the low power mode upon receiving an optical signal while in the low power mode.

According to another aspect, there is provided a battery management system that comprises the pack controller of any of the foregoing aspects or suitable combinations thereof optically coupled to a first module controller of any of the foregoing aspects or suitable combinations thereof.

The battery management system may further comprise an additional module controller optically coupled upstream of the first module controller.

In the battery management system, when the optical safety signal is transmitted from the pack controller to the module controller, the optical safety signal may be transmitted using a communication channel that comprises a loop that permits the optical safety signal to be returned to the pack controller.

According to another aspect, there is provided a method for optically communicating with a module controller that comprises part of a battery module. The method comprises receiving, at a pack controller and from the module controller, a received optical signal; converting, at the pack controller, the received optical signal into a received electrical signal; and processing the received electrical signal.

The method may further comprise generating, at the pack controller, a transmitted electrical signal; converting, at the pack controller, the transmitted electrical signal into a transmitted optical signal; and transmitting the transmitted optical signal to the module controller.

A pack controller processor, comprising part of the pack controller, may generate the transmitted electrical signal and process the received electrical signal.

The received optical signal may comprise message data indicative of a state of the battery module, and the transmitted optical signal may comprise message data requesting the state of the battery module.

Communication between the pack controller and the module controller may be half-duplex communication.

Communication between the pack controller and the module controller may be full-duplex communication.

The transmitted optical signal may be transmitted along a first communication channel and the received optical signal is received along a second communication channel.

The received and transmitted optical signals may be received and transmitted, respectively, along a single communication channel.

The method may further comprise determining whether the received electrical signal comprises an optical safety fault signal indicating the battery module has experienced a safety fault; and when the received electrical signal comprises the optical safety fault signal, decoupling a battery cell comprising part of the battery module from a power bus.

The method may further comprise generating, at the pack controller, an optical safety signal; and transmitting the optical safety signal to the module controller.

The module controller may transmit the pack controller an optical resume signal after the safety fault ends, and the method may further comprise receiving, at the pack controller, the optical resume signal; and in response to receiving the optical resume signal, electrically coupling the battery cell to the power bus, wherein the pack controller is in a fault state while the battery cell is electrically coupled to the power bus and in a normal state while the battery cell is electrically decoupled from the power bus.

The optical safety signal and the optical resume signal may be identical.

A pack controller processor may output the optical safety signal to the module controller only when the module controller is in the fault state.

The optical safety signal may comprise a digital signal that is non-constant over a clock cycle of the processor and the optical safety fault signal may be constant over a clock cycle of the processor.

A watchdog timer may be used to determine whether the pack controller has received the optical safety fault signal.

The method may further comprise, when the pack controller is in the fault state, receiving and transmitting optical message data to and from the module controller, wherein the optical message data may be transmitted to the module controller using a communication channel distinct from a communication channel used to transmit the optical safety signal.

The optical message data may be transmitted using half-duplex communication when the pack controller is in the fault state.

The method may further comprise, when the pack controller is in the normal state, receiving and transmitting the optical message data to and from the module controller, wherein the optical message data may be transmitted to the module controller using a communication channel used to transmit the optical safety signal to the module controller when the pack controller is in the fault state.

Communication between the pack controller and the module controller may be full-duplex communication when the pack controller is in the normal state.

The pack controller may comprise a first multiplexer communicatively coupled to the processor, and the processor may signal a selection input of the first multiplexer to transmit the optical message data when the pack controller is in the normal state and to transmit the optical safety signal when the pack controller is in the fault state.

The pack controller may comprise a second multiplexer communicatively coupled to the processor and the first multiplexer, and the processor may signal a selection input of the second multiplexer to transmit the optical message data when the pack controller is in the normal state and to transmit the optical message data when the pack controller is in the fault state.

The method may further comprise receiving optical message data from the module controller, wherein the optical message data may be received from the module controller using a second communication channel distinct from a first communication channel used to transmit the optical safety signal.

The method may further comprise transmitting the optical message data to the module controller, wherein the optical message data may be transmitted to the module controller using the second communication channel.

Communication between the module controller and the pack controller on the first and second communication channels may be simplex communication.

When the pack controller is in the fault state, the optical message data may be received from and transmitted to the module controller using the second communication channel.

The module controller may comprise one of multiple module controllers to which the pack controller is communicatively coupled, and may further comprise determining which of the module controllers is affected by the safety fault; and commanding one of the module controllers upstream of the safety fault to forward the message data from the first communication channel to the second communication channel.

Determining which of the module controllers is affected by the safety fault may comprise determining which of the module controllers is unresponsive to commands that the pack controller sends; and determining that the module controllers affected by the safety fault comprise the module controllers that are unresponsive to the commands that the pack controller sends.

The method may further comprise signaling the module controller to enter a lower power mode when the battery cell is decoupled from the power bus and the pack controller is not in the fault state.

According to another aspect, there is provided a method for optically communicating with a pack controller using a module controller that comprises part of a battery module. The method comprises generating, at the module controller, a transmitted electrical signal; converting, at the module controller, the transmitted electrical signal into a transmitted optical signal; and transmitting, to the pack controller, the transmitted optical signal.

The method may further comprise receiving, at the module controller and from the pack controller, a received optical signal; converting, at the module controller, the received optical signal into a received electrical signal; and processing the received electrical signal.

A module controller processor, comprising part of the module controller, may generate the transmitted electrical signal and processes the received electrical signal.

The transmitted optical signal may comprise message data indicative of a state of the battery module, and the received optical signal may comprise message data requesting the state of the battery module.

The transmitted optical signal may comprise message data indicative of a state of the battery module and be transmitted absent a request from the pack controller to do so.

Communication between the pack controller and the module controller may be half-duplex communication.

Communication between the pack controller and the module controller may be full-duplex communication.

The received optical signal is received along a first communication channel and the transmitted optical signal may be transmitted along a second communication channel.

The received and transmitted optical signals may be received and transmitted, respectively, along a single communication channel.

The method may further comprise communicating with an upstream module controller using the single communication channel.

The method may further comprise relaying the optical message data received from the upstream module controller downstream to the pack controller using the single communication channel.

The method may further comprise generating a fault detection signal in response to detecting a safety fault on the battery module; and when the fault detection signal is generated, transmitting an optical safety fault signal to the pack controller.

The fault detection signal and an electrical safety fault signal from which the optical safety fault signal is generated may be identical.

The optical fault signal may be sent to a watchdog timer on the pack controller and may comprise a constant signal that is held constant for longer than a timeout period of the watchdog timer.

The module controller may comprise a first interlock contact to which a power connector is connectable, wherein the power connector may also be connected to a pair of battery contacts that is electrically coupled to a battery cell comprising part of the battery module when connected to the interlock contact and that is unconnected to the pair of battery contacts when unconnected to the interlock contact. The method may further comprise generating the fault detection signal when the power connector is unconnected.

The module controller may further comprise a second interlock contact to which the first interlock contact is electrically coupled when the power connector is connected and is electrically uncoupled when the power connector is unconnected. Generating the fault detection signal may comprise pulling-up or pulling-down the second interlock contact to the fault detection signal when the power connector is unconnected and outputting a signal on the second interlock contact different from the fault detection signal when the power connector is connected.

The module controller may further comprise at least one of a voltmeter electrically coupled across the battery cell and a thermistor positioned to measure a temperature of the battery cell, and the fault detection signal may be generated in response to one or more of an overvoltage condition, undervoltage condition, overtemperature condition, loss of communication with another module controller, loss of communication with the pack controller, and failure of the module controller processor.

The method may further comprise, once the safety fault ceases, ceasing to generate the fault detection signal; and transmitting the optical resume signal to the pack controller.

The optical safety signal and the optical resume signal may be identical.

The module controller may comprise a module controller processor, and the method may further comprise, when the battery module is experiencing the safety fault, receiving and transmitting optical message data from and to the pack controller using a communication channel distinct from a communication channel used to transmit the optical resume signal.

The method may further comprise, when the battery module is experiencing the safety fault, receiving and transmitting optical message data from and to an upstream module controller using the communication channel distinct from the communication channel used to transmit the optical resume signal.

The optical message data may be communicated using half-duplex communication when the battery module is experiencing the safety fault.

When the battery module is not experiencing the safety fault, the pack controller may transmit the optical message data to the module controller using the communication channel used to transmit the optical resume signal and the module controller processor may relay the optical message data downstream using the communication channel used to receive and transmit the optical message data when the battery module is experiencing the safety fault.

The optical message data may be communicated using full-duplex communication when the safety module is not experiencing the safety fault.

The method may further comprise receiving and transmitting optical message data from and to the pack controller, wherein the optical message data may be received and transmitted on a second communication channel distinct from a first communication channel used to transmit the optical resume signal; transmitting downstream along the second communication channel responses, comprising part of the optical message data, to commands sent by the pack controller; forwarding the optical message data that is non-duplicative and received upstream along the second communication channel downstream along the second communication channel; and performing the commands received from the pack controller regardless of whether the commands are received along the first or second communication channels.

The method may further comprise forwarding all of the optical message data received upstream along the second communication channel downstream along the second communication channel.

The method may further comprise, only when the battery module is experiencing the safety fault, forwarding the optical message data that is non-duplicative and received upstream along the first communication channel downstream along the second communication channel.

Alternatively, the method may further comprise, regardless of whether the battery module is experiencing the safety fault, forwarding the optical message data that is non-duplicative and received upstream along the first communication channel downstream along the second communication channel.

Communication along the first and second communication channels may be simplex communication regardless of whether the battery module is experiencing the safety fault.

The method may further comprise causing the module controller to enter a low power mode upon the module controller not having received an optical signal for a timeout period.

The method may further comprise receiving, at the module controller, a command from the pack controller to enter a low power mode; and causing the module controller to enter a low power mode.

The method may further comprise exiting the low power mode upon the module controller receiving an optical signal while in the low power mode.

According to another aspect, there is provided a method for communicating between a pack controller and a first module controller that comprise part of a battery management system. The method may comprise the method for optically communicating with the module controller of any of the above aspects or suitable combinations thereof and the method for optically communicating with the pack controller of any of the above aspects or suitable combinations thereof.

The battery management system may comprise an additional module controller optically coupled upstream of the first module controller.

In the battery management system, when the optical safety signal is transmitted from the pack controller to the module controller, the optical safety signal may be transmitted using a communication channel that comprises a loop that permits the optical safety signal to be returned to the pack controller.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments:

FIGS. 7A-10B depict message data propagating through the embodiments of the battery management system depicted in FIGS. 1E and 1F, according to additional embodiments.

DETAILED DESCRIPTION

Figure 1A:
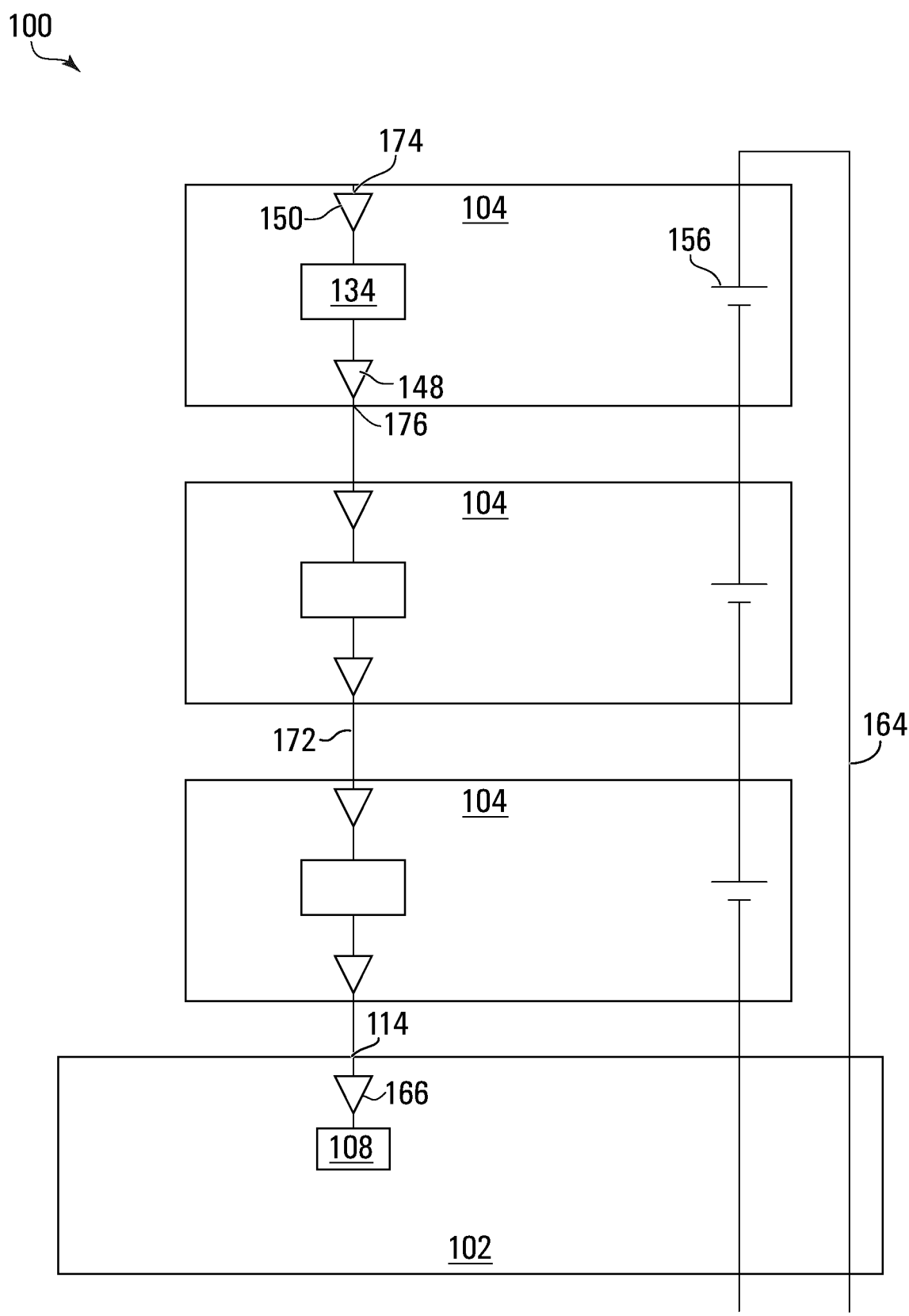
FIGS. 1A-1F are schematics of six different embodiments of a battery management system comprising a pack controller and module controllers.

A battery management system ("BMS") is typically used in conjunction with a battery pack to carry out certain functions, such as the following:
  (a) balancing battery cells within each battery module and across the pack;
  (b) monitoring state-of-charge ("SOC") of each of the cells;
  (c) transmitting the SOC and allowable charge/discharge rates to any equipment the battery pack is powering; and
  (d) interrupting current delivered from the battery pack to a direct current ("DC") power bus as appropriate to prevent any one or more of overcharging, overdischarging, and charging/discharging at unsafely high temperatures.

Since the voltmeters and temperature sensors (e.g., thermistors) used to measure cell voltage and temperature typically physically contact the battery cells, at least a portion of the BMS is located within each of the battery modules being monitored; this portion is referred to herein as the "module controller", with each of the battery modules comprising its own module controller. The BMS also comprises a "pack controller" that is separate from the module controller and that comprises switchgear, such as breakers or contactors, that electrically couple and decouple the battery cells in the battery modules to the power bus.

Communication between the pack controller and the module controllers is typically digital and conventionally performed using electrical signals. Message data, such as data representing the temperature or voltages of the modules' battery cells, can be exchanged between the pack controller and the module controllers. Additionally or alternatively, a high voltage interlock loop ("HVIL") can extend through the pack and module controllers and signal the pack controller when a power connector has been removed from any one or more of the modules. When the power connector is so removed, the pack controller signals the switchgear to disconnect the battery cells from the power bus for safety reasons.

One issue with using electrical signals is that they are susceptible to electromagnetic interference, which can distort the message data and the signal transmitted on the HVIL between the pack and module controllers. To address this issue, some of the embodiments described herein are directed at an optically communicative BMS. The pack controller and module controllers that comprise the BMS optically communicate with each other, such as by using optical fiber or light pipe, and those optical communications are immune from electromagnetic interference.

Another problem related to battery management systems is how to increase bandwidth of a limited number of communication channels between the pack and module controllers; increased bandwidth permits one or both of communication to occur more quickly and fewer channels to be used, which saves on component costs and lowers the likelihood of component failure. Some of the embodiments described herein use a type of time division multiplexing so communication channels can be used to transmit different types of data depending on the operating state of the system, thereby permitting increased bandwidth. Additionally or alternatively, in different embodiments (not depicted) one or both of frequency division multiplexing and polarization division multiplexing may be used.

BMS Architecture

Referring now to FIGS. 1A-1F, there are shown schematics of six different embodiments of a BMS 100 comprising a pack controller 102 and module controllers 104. The module controllers 104 are communicatively coupled together in series, and signals propagating towards the pack controller 104 from any one of the module controllers 104. As used herein, for any two module controllers 104, if data from a first of the module controllers 104 is transmitted through a second of the module controllers 104 en route to the pack controller 102, the first of the module controllers 104 is located "upstream" from the second of the module controllers 104, and analogously the second of the module controllers 104 is located "downstream" from the first of the module controllers. The series connection of module controllers 104 is referred to interchangeably herein as a "string" of module controllers 104.

The pack controller 102 comprises a pack controller processor 108 and a pack controller memory (not depicted) that is communicatively coupled to the processor 108 and that stores computer program code that is executable by the processor 108. When executed by the processor 108, the computer program code causes the processor 108 to perform the functionality described below. The processor 108 is one example of signal processing circuitry that is used to process signals that the pack controller 102 receives from the module controllers 104. Different embodiments may comprise different types of pack controller signal processing circuitry; for example, the signal processing circuitry may additionally or alternatively comprise at least one of digital and analog electronic devices, such as application specific integrated circuits.

A first communication channel 172 communicatively couples the module controllers 104 and the pack controller 102 together. The pack controller 102 comprises a first pack controller optical input 114 for receiving an optical signal from the communication channel 172. The pack controller 102 also comprises a first pack controller electro-optical receiver 166 optically coupled to the optical input 114 and that is configured to convert the received optical signal into an electrical signal. The pack controller processor 108 is communicatively coupled to the output of the electro-optical receiver 166 to receive the electrical signal and to subsequently process it as desired.

For any one of the depicted embodiments the module controllers 104 are identically constructed, although in different embodiments (not depicted) any one or more of the module controllers 104 may be constructed differently than the others. Each comprises a module controller processor 134 and a module controller memory (not depicted) that is communicatively coupled to the processor 134 and that stores computer program code that is executable by the processor 134 and that, when executed by the processor 134, causes the processor 134 to perform the functionality described below. Each of the module controllers 104 also comprises a first upstream optical input 174 and a first downstream optical output 176 used to receive an optical signal from and transmit an optical signal to, respectively, the communication channel 172. A first module controller electro-optical receiver 150 is communicatively coupled to the optical input 174 and the module controller processor 134, and is configured to receive an optical signal from the communication channel 172 and convert it into an electrical signal for transmission to the processor 134. Analogously, a first module controller electro-optical transmitter 148 is communicatively coupled to the optical output 176 and the module controller processor 134, and is configured to receive the electrical signal output by the processor 134 and convert it into an optical signal for downstream transmission. The module controller processor 134 and memory comprise module controller signal processing circuitry (when receiving signals via the electro-optical receiver 150) and signal generation circuitry (when transmitting signals via the electro-optical transmitter 148). Different embodiments may comprise different types of module controller signal processing circuitry, signal generation circuitry, or both; for example, one or both of the module controller signal processing and signal generation circuitry may additionally or alternatively comprise at least one of digital and analog electronic devices, such as application specific integrated circuits.

Each of the battery modules 104 also comprises a battery cell 156, and the battery cells 156 of the pack are electrically coupled together using a DC power bus 164. Although a single battery cell 156 is depicted in FIG. 1A, in practice the battery modules 104 comprise multiple battery cells 156 connected in one or both of series and parallel.

In FIG. 1A, any one or more of the module controllers 104 may communicate with the pack controller 102. For example, if the most upstream module controller 104 wishes to send a message to the pack controller 102, the processor 134 for that module controller 104 sends an electrical message to the electro-optical transmitter 148 for that module controller 104, which optically transmits the message to the immediately downstream module controller 104 (the middle module controller 104 in FIG. 1A). The electro-optical receiver 150 receives the optical message, converts it to an electrical message, and transmits it to the processor 134 for that module controller 104. The middle module controller 104 then relays the message in an analogous fashion to the most downstream module controller 104, which in turn relays the message to the pack controller 102.

Figure 1B:
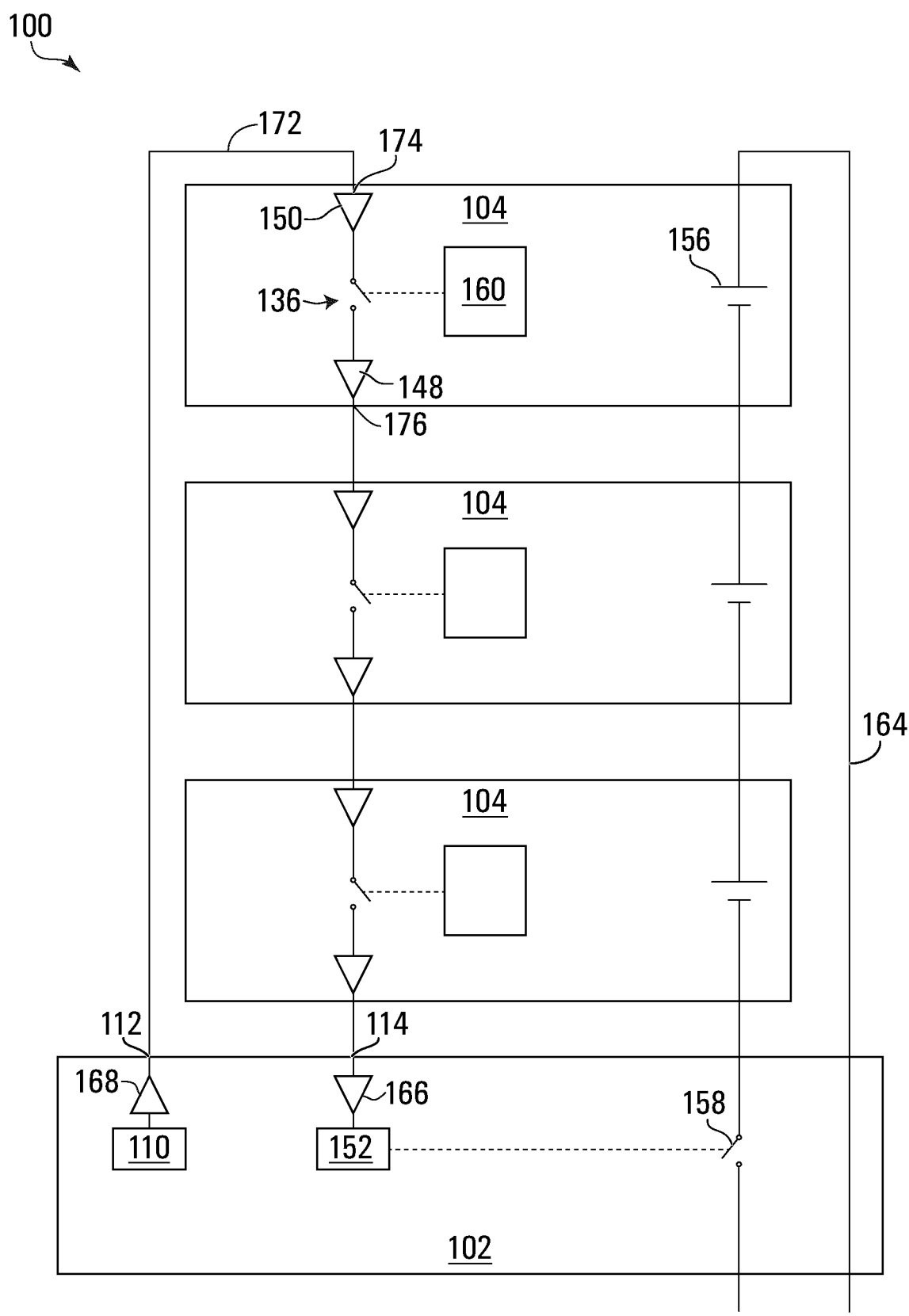

FIG. 1B shows another embodiment of the BMS 100. As with the BMS 100 of FIG. 1A, the BMS 100 of FIG. 1B comprises the pack and module controllers 102,104 and the electro-optical transmitters 148 and receivers 150,166. The first communication channel 172 communicatively couples the module controllers 104 and pack controller 102, although in FIG. 1B the channel 172 is extended to also permit the pack controller 102 to transmit data to, and not only receive data from, the module controllers 104. The pack controller 102 accordingly comprises a pack controller electro-optical transmitter 168 configured to receive an electrical signal and to output an optical signal to the communication channel 172 via a first pack controller optical output 112. The optical signal that the pack controller 102 outputs is received at the optical input 174 of the most upstream module controller 104, which relays the message through the remaining module controllers 104 as discussed above in respect of FIG. 1A.

In FIG. 1B, the channel 172 is used to transmit two different types of communications signals: a safety fault signal from any one or more of the module controllers 104 to the pack controller 102, and a safety signal from the pack controller 102 to the module controllers 104. Each of the module controllers 104 comprises safety fault detection circuitry 160 that detects whether the module controller 104 is experiencing a safety fault, such as an overvoltage, undervoltage, or overtemperature condition, or such as the power connector having been removed from the battery module comprising that module controller 104 as described in further detail in respect of FIGS. 2 and 5, below.

Upon detecting a safety fault, the safety fault detection circuitry 160 generates a fault detection signal and sends it to safety override circuitry 136. In FIG. 1B, the safety override circuitry comprises a switch such as a MOSFET, but as discussed in further detail below, the safety override circuitry 136 may alternatively or additionally comprise a logic gate or a multiplexer, for example. When the safety override circuitry 136 of FIG. 1B does not receive the fault detection signal from the safety override circuitry 136, it closes the switch and accordingly relays the safety signal received from an upstream module controller 104 or the pack controller 102 to a downstream module controller 104 or the pack controller 102. In contrast, when the safety override circuitry receives the fault detection signal, it opens the switch and does not relay the safety signal. The safety override circuitry 136 and safety fault detection circuitry 160 also comprise examples of the module controller signal generation circuitry and signal processing circuitry.

The pack controller 102 comprises a safety loop signal generator 110 that generates a safety loop signal and that is electrically coupled to the input of the pack controller electro-optical transmitter 168; the safety loop signal may comprise a pulse, be a continuous signal, or a complex signal (e.g., a periodic signal). The pack controller 102 also comprises safety return circuitry 152 electrically coupled to the output of the pack controller electro-optical receiver 166, and accordingly either receives the safety signal (when none of the module controllers 104 is detecting a safety fault) or does not receive the safety signal (when any one or more of the module controllers 104 is detecting a safety fault). The safety return circuitry 152 is communicatively coupled to switchgear 158 and signals the switchgear 158 to electrically couple the battery cells 156 to the power bus 164 when the safety return circuitry 152 detects the safety signal, and to electrically decouple the battery cells 156 from the power bus 164 when the safety return circuitry 152 does not detect the safety signal. The safety return circuitry 152 is one example of the pack controller signal processing circuitry.

In the embodiment of FIG. 1B, safety return circuitry 152 comprises a watchdog timer, and the safety loop signal generator 110 comprises an oscillator that generates a signal that varies more frequently than the timeout period of the watchdog timer. Accordingly, when none of the module controllers 104 is experiencing a safety fault, the watchdog timer receives the safety signal prior to the expiry of its timeout period and does not trigger the switchgear 158. In contrast, if any one or more of the module controllers 104 is experiencing a safety fault, the watchdog timer does not receive the safety signal and triggers, thereby signaling the switchgear 158 to decouple the cells 156 from the power bus 164. The watchdog timer may comprise, for example, a Linear Technology™ 6995 series integrated circuit. As used herein, the output of the watchdog timer is not used to trigger a reset of the entire system 100 as is done conventionally, but rather is used to control the switchgear 158.

In one different embodiment (not depicted), the safety override circuitry 136 comprises a multiplexer whose selection input is communicatively coupled to the fault detection circuitry 160 and that has one data input communicatively coupled to the output of the electro-optical receiver 150 and another data input communicatively coupled to a resume signal generator. When the fault detection circuitry 160 does not detect any fault, the multiplexer relays the safety signal from the module controller optical input 174 to the module controller optical output 176. If the fault detection circuitry detects a fault, the multiplexer instead relays the resume signal from the resume signal generator to the module controller optical output 176. The safety return circuitry 152 is configured to detect in one embodiment whether the safety signal has been returned to the pack controller 102, and in a different embodiment is configured to detect whether the resume signal has been sent to the pack controller 102. In embodiments in which the safety return circuitry 152 is configured to detect whether the resume signal has been sent to the pack controller 102, the safety return circuitry 152 may keep the cells 156 electrically decoupled from the power bus 164 until the resume signal is received.

Figure 1C:
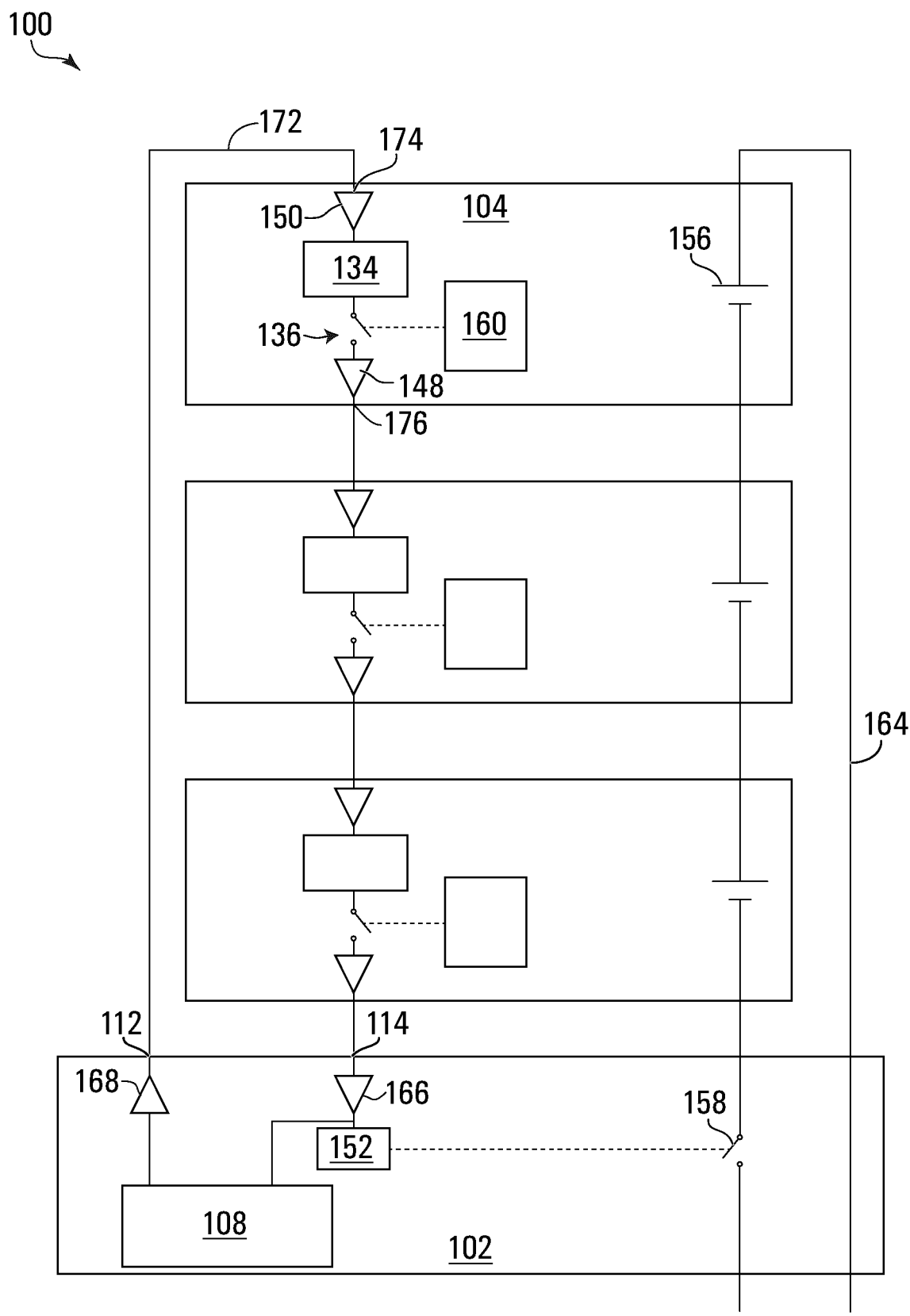

FIG. 1C shows another embodiment of the BMS 100 in which the pack controller processor 108 and module controller processor 134 are integrated into the embodiment of FIG. 1B. More particularly, the pack controller processor 108 performs the functionality of the safety loop signal generator 110 and sends message data that also acts as the safety signal. For example, in an embodiment in which the safety return circuitry 152 comprises the watchdog timer, the pack controller processor 108 is configured to output message data that varies more frequently than the timeout period of the watchdog timer including by, if necessary, sending a "no operations" signal when no message data is to be transmitted. The pack controller processor 108 is communicatively coupled in parallel with the safety return circuitry 152 to receive any message data relayed or sent by the module controllers 104.

Similarly, each of the module controllers 104 in FIG. 1C comprises the module controller processor 134 communicatively coupled in series between the module controller electro-optical receiver 150 and transmitter 148. As in FIG. 1A, the module controller processor 134 may send message data indicative of module controller state downstream to the pack controller 102, to be relayed by any module controllers 104 located in series between the module controller 104 sending the message and the pack controller 102.

Figure 1D:
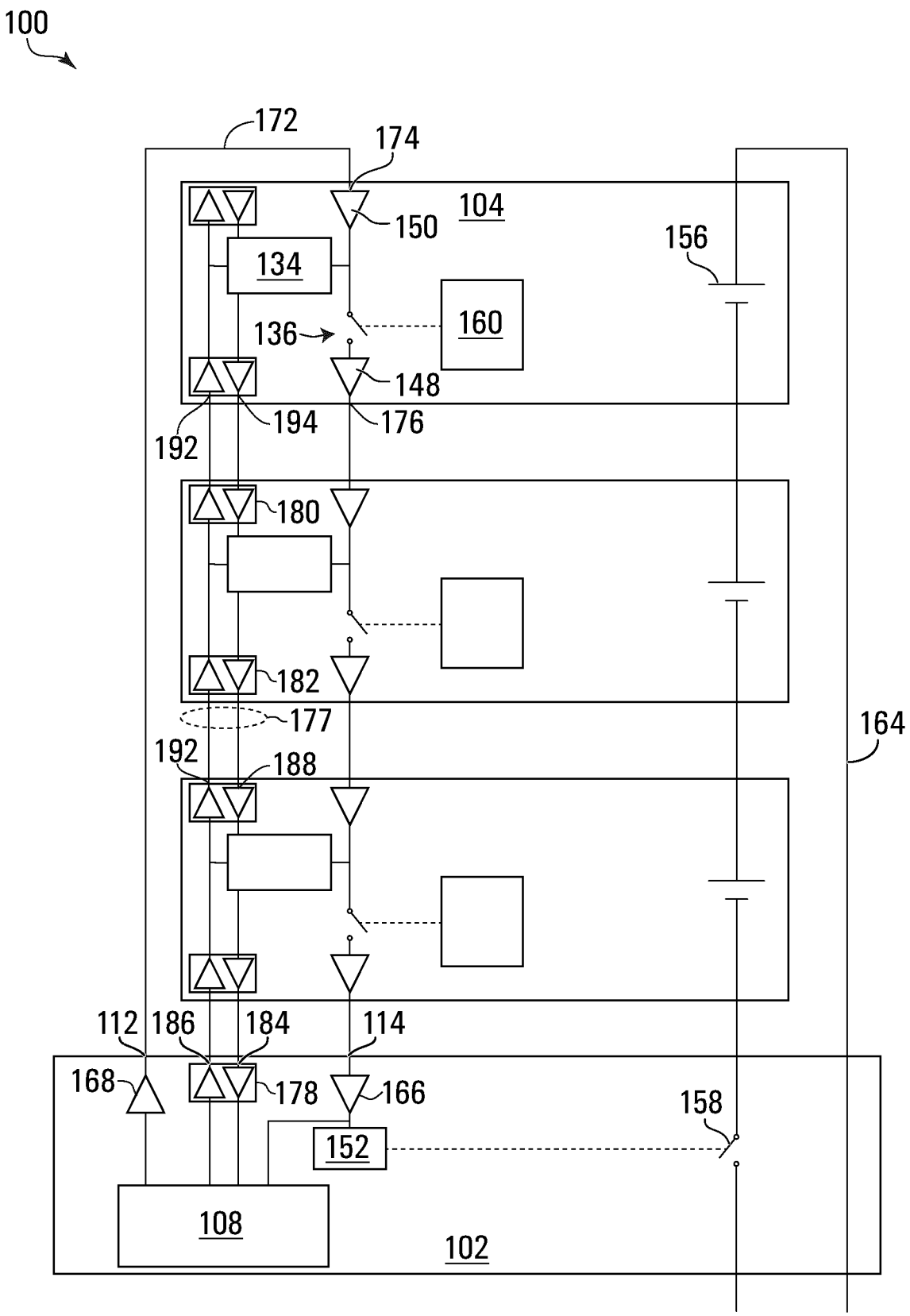

FIG. 1D shows another embodiment of the BMS 100 in which the BMS 100 of FIG. 1C is modified by adding a second communication channel 177 that permits communication even in the event the first communication channel 172 cannot be used for communication because a safety fault is preventing it from being used to transfer data. The communication via the second communication channel 177 may be half-duplex as described below in respect of FIG. 3C, or may be full-duplex in different embodiments. In FIG. 1D, the pack controller 102 comprises a pack controller electro-optical transceiver 178 electrically coupled to the pack controller processor 108. The pack controller 102 further comprises a second pack controller optical input 184 and a second pack controller optical output 186 via which the electro-optical transceiver 178 receives and transmits optical signals, respectively. Similarly, each of the module controllers 104 comprises a downstream electro-optical transceiver 182 and an upstream electro-optical transceiver 180, each of which is electrically coupled to the module controller processor 134. Each of the module controllers 104 further comprises a second upstream optical input 188 and a second upstream optical output 190 via which the module controller 104 receives and sends optical signals using the upstream electro-optical transceiver 180, respectively; and a second downstream optical input 192 and a second downstream optical output 194 via which the module controller 104 receives and sends optical signals using the downstream electro-optical receiver 182, respectively. Each electro-optical transceiver in the depicted example embodiment comprises an electro-optical transmitter and an electro-optical receiver. Additionally, in the depicted embodiment a pair of optical fibers or lightpipes are used to transmit optical signals sent to and from a transceiver; however, in a different embodiment (not depicted), a single fiber or lightpipe can be used to send and receive signals via the transceiver if wavelength or time-division multiplexing is used. The pack controller processor 108 is able to send a message to all of the module controller processors 134 by transmitting a signal upstream along the second communication channel 177, and is able to receive a message from any one or more of the module controller processors 134 via the second communication channel 177 when the module controller processors 134 relay the message downstream.

Figure 1E:
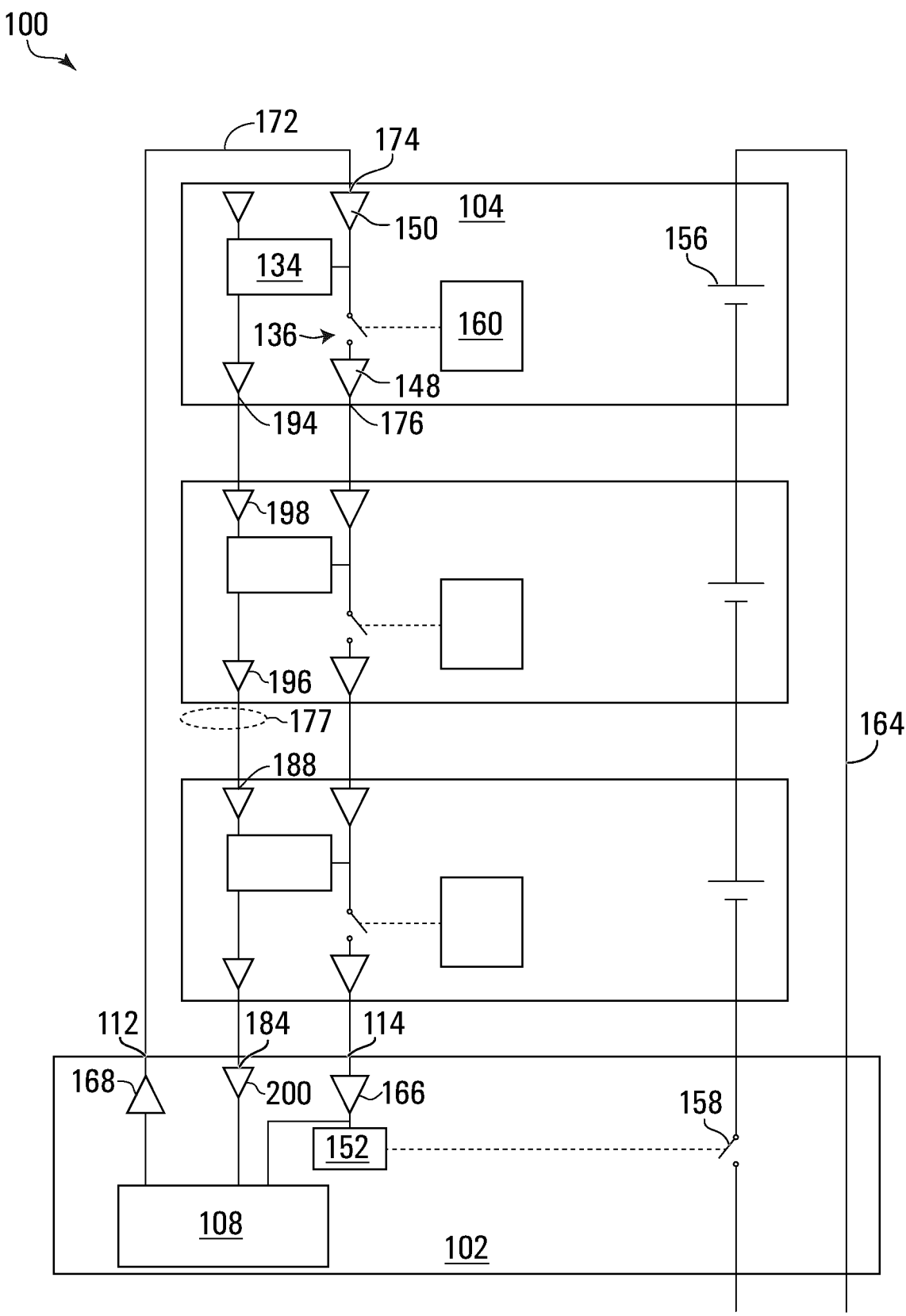

FIG. 1E shows another embodiment of the system 100 in which the embodiment of FIG. 1D is modified by replacing the upstream electro-optical transceiver 180 with a second module controller electro-optical receiver 198, and by replacing the downstream electro-optical transceiver 182 with a second module controller electro-optical transmitter 196. The second communication channel 177 is accordingly a simplex (i.e., unidirectional) channel used to send data downstream. As with the embodiment of FIG. 1D, the second communication channel 177 permits communication even in the event the first communication channel 172 cannot be used for communication because of a safety fault in one of the module controllers 104. As discussed in more detail in respect of FIGS. 8A-8D below, the second communication channel 177 may also be used for communication when the system 100 is not experiencing a safety fault. For example, the second communication channel 177 may send data concurrently with the data on the first communication channel 172, or may be used to send data if the first communication channel 172 is not being used for data transmission notwithstanding the system 100 not experiencing a safety fault.

The embodiment of FIG. 1D is also modified in FIG. 1E by replacing the electro-optical transceiver 178 in the pack controller 102 with a second pack controller electro-optical receiver 200, which receives the optical signals transmitted from the module controllers 104 and converts them to an electrical signal for transmission to the pack controller processor 108. While in FIG. 1E the transceivers 178,180, 182 have been replaced with receivers 200,198,196, in different embodiments (not depicted) the embodiment of FIG. 1D may retain any one or more of the transceivers 178,180,182 and be functionally equivalent to the embodiment of FIG. 1E by only using the electro-optical receivers comprising those one or more transceivers 178,180,182.

As with the embodiment of FIG. 1D, the embodiment of FIG. 1E may use one or both of lightpipes and optical fibers to communicate between the pack and module controllers 102,104, and data may be one or both of wavelength and time-division multiplexed. The pack controller processor 108 is able to send a message to all of the module controller processors 134 by transmitting a signal upstream along the second communication channel 177, and is able to receive a message from any one or more of the module controller processors 134 via the second communication channel 177 when the module controller processors 134 relay the message downstream.

Figure 1F:
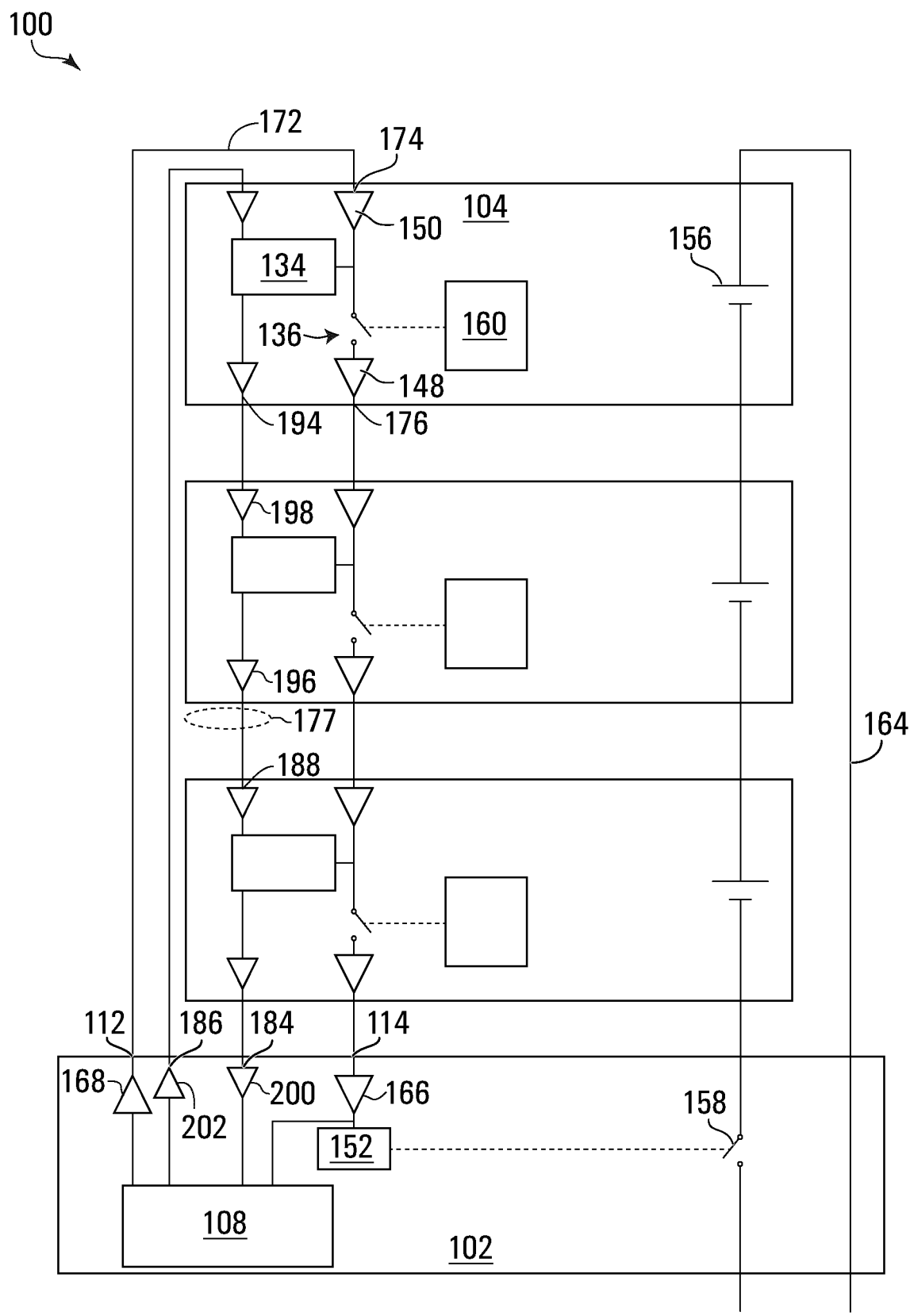

FIG. 1F shows another embodiment of the system 100 in which both the first and second communication channels 172,177 comprise simplex loops; that is, when none of the module controllers 104 is experiencing a safety fault, the pack controller 102 may transmit data to the module controllers 104 along the first and second communication channels 172,177 and receive data from or that has been transmitted through the module controllers 104 along the first and second communication channels 172,177. The embodiment of FIG. 1F is identical to the embodiment of FIG. 1D except that the pack controller 102 in FIG. 1F further comprises a second pack controller electro-optical transmitter 202 that outputs an optical signal via the second pack controller optical output 186 to the second upstream optical input 188 of the most upstream module controller 104.

Figure 2:
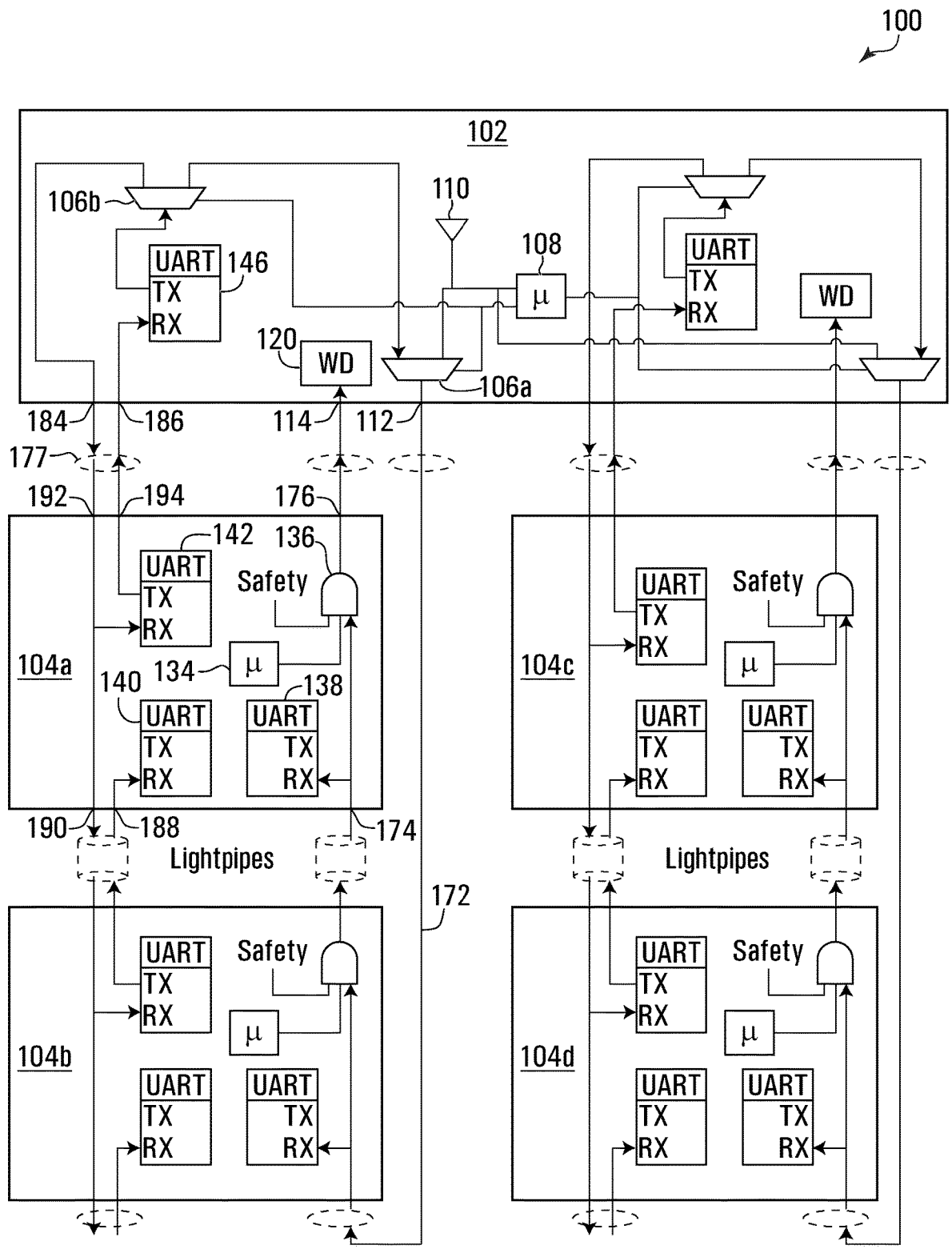
FIG. 2 is a schematic of another embodiment of the battery management system.

FIG. 2 shows another embodiment of the battery management system 100 comprising the pack controller 102 and four module controllers 104*a-d*. A first and a second module controller 104*a,b* (the "first string of module controllers 104") are connected in series together with the pack controller 102, while a third and a fourth module controller 104*c,d* (the "second string of module controllers") are connected in series together with the pack controller 102 and in parallel with the first string of module controllers 104. The pack controller 102 comprises the pack controller processor 108 that is communicatively coupled to a pack controller memory (not shown); the pack controller memory stores computer program code that is executable by the pack controller processor 108 and that, when executed by the processor 108, causes the processor 108 to perform the functionality described below and depicted in FIGS. 3A-3C.

The pack controller 102 also comprises the safety loop signal generator 110 that is used to generate the safety signal sent to the module controllers 104. The safety signal in the depicted embodiment is a clock pulse that is time division multiplexed with message data along first and second communication channels communicative with the first and second strings of modules 104, respectively.

While the discussion below focuses on the first string of module controllers 104, in the depicted embodiment each of the module controllers 104 is identically constructed and the circuitry described below on the pack controller 102 that interfaces with the first string of module controllers is mirrored on the pack controller 102 to analogously interface with the second string of module controllers 104.

In respect of the first string of module controllers 104, the pack controller processor 108 is also communicative with an electrical transceiver in the form of a pack controller universal asynchronous receiver/transmitter ("UART") 146 and first and second multiplexers 106a,b (collectively, "multiplexers 106"). The multiplexers 106 in the depicted embodiment comprise an NXP Semiconductors™ N.V. NX3L2467 double pole double throw switch, although in different embodiments (not depicted) one or both of the multiplexers 106 may be implemented using one or both of different hardware and software. The pack controller processor 108 directly controls the selection input of each of the multiplexers 106. As discussed in further detail below in respect of FIGS. 3A-3C, the battery management system 100 is operable in a full-duplex communication mode (hereinafter simply "full-duplex mode") and a half-duplex communication mode (hereinafter simply "half-duplex mode"). When operating in full-duplex mode, the pack controller processor 108 sends message data to the first string of module controllers 104 via the first communication channel 172 (hereinafter interchangeably referred to in the context of FIG. 2 as a "safety return communication channel"), which the pack controller processor 108 accesses via the first pack controller optical output 112 and the first pack controller optical input 114. Also when operating in full-duplex mode, the pack controller processor 108 receives message data from the first string of module controllers 104 via the second communication channel 177 (hereinafter interchangeably referred to in the context of FIG. 2 as a "dedicated message data communication channel"), which the pack controller processor 108 accesses via the second pack controller optical input 184 and the second pack controller optical output 186. When operating in half-duplex mode, the pack controller processor 108 sends and receives message data to and from the first string of module controllers 104 via only the dedicated message data communication channel using the second pack controller optical output and input 186,184. Also when operating in half-duplex mode, the pack controller processor 108 outputs the safety signal along the safety return communication channel. The pack controller 102 also comprises the safety return circuitry in the form of a watchdog timer 120, which evaluates the input signal that the pack controller 102 receives from the first module string 104 via the first pack controller optical input 114. When in full-duplex mode, the watchdog timer 120 monitors that input signal to determine whether a safety fault has occurred in any one of the modules 104 comprising the first string of modules 104; if so, the pack controller 102 disconnects the battery modules comprising the first string of modules 104 from the direct current ("DC") power bus to which the battery cells comprising first string of modules are electrically coupled by opening the switchgear 158 (not shown in FIG. 2). When in half-duplex mode, the watchdog timer 120 monitors that input signal and waits for a resume signal, which indicates that the safety fault has been rectified. In response, the pack controller 102 reconnects the battery modules to the DC power bus by closing the switchgear 158.

In the depicted example embodiment, the switchgear 158 is open whenever any one or more of the battery modules 104 is experiencing a safety fault, but may also be open when none of the modules 104 is experiencing a safety fault (e.g., in response to a user request).

In the depicted embodiment the pack controller 102 communicates optically with the first string of modules 104. To transmit the optical safety signal to the first string of modules 104 via the first pack controller optical output 112, the pack controller 102 comprises an electro-optical transmitter in the form of a switch that is electrically coupled to a light emitting diode ("LED"). The switch comprises in this embodiment a MOSFET that is actuated by pack controller processor 108. When the switch is on, current flows through the LED and a signal is transmitted. Conversely, when the switch is off, no current flows through the LED and no signal is transmitted. The optical signal that the pack controller processor 108 transmits via the second pack controller optical output 186 is similarly generated. Optical data that the pack controller 102 receives from the first string of modules 104 via the second pack controller optical input 184 and the first pack controller optical input 114 is converted to an electrical signal using an electro-optical transceiver, such as a MAX3120 IrDA transceiver from Maxim™ Integrated Products, Inc. In different embodiments (not depicted), a standalone receiver may be used as an alternative to a transceiver and, analogously, a transceiver may be used in place of the MOSFET controlled LED described above. While the embodiments depicted herein are directed at optical communication, in different embodiments communication between the pack controller 102 and the module controllers 104 may be electrical.

Each of the module controllers 104 in the depicted embodiment comprises safety fault detection circuitry 160 (not depicted in FIG. 2, but depicted in FIG. 5), which generates a fault detection signal indicating that the battery module for that module controller 104 has experienced a safety fault; safety override circuitry 136; a module controller processor 134 and a module controller memory (not depicted) that stores program code that is executable by the module controller processor 134 and that, when executed by the processor 134, causes the processor 134 to perform the functionality described below; and first through third module controller UARTs 138,140,142, each of which is communicatively coupled with the module controller processor 134. The module controller 104 also comprises three inputs and three outputs: data transmitted along the safety return communication channel is received and transmitted by the module controller 104 via the first upstream optical input 174 and the first downstream optical output 176, respectively; message data transmitted to and received from the pack controller 102 by the module controller 104 along the dedicated message data communication channel is transmitted using the second downstream optical output 194 and input 192, respectively; and message data transmitted to and received from upstream module controllers 104, such as the second module controller 104b in respect of the first string of module controllers 104, along the dedicated message data communication channel is transmitted using the second upstream optical output 190 and input 188, respectively. As with the pack controller 102, data transmitted by any one of the module controllers 104 to the pack controller 102 or to other module controllers 104 is transmitted optically, with conversion between electrical and optical signals being performed using electro-optical transmitters, receivers, or transceivers, as described above in respect of the pack controller 102.

In the depicted embodiment, the safety override circuitry 136 comprises an AND gate having three inputs: one input is connected to the output of the safety fault detection circuitry 160 and receives any fault detection signal that it generates; a second input is connected to an output of the module controller processor 134; and a third input is connected in parallel with a receive channel of the first module controller UART 138 to the first upstream optical input 174. As discussed in further detail below, if the output of the module controller processor 134 and the fault detection signal are both high, the safety override circuitry 136 simply relays the signal received at the first upstream optical input 174 to the first downstream optical output 176 for eventual return to the pack controller 102. If either the module controller 104 is experiencing a safety fault or the module controller processor 134 otherwise desires to interrupt communication, either can send the safety fault signal to the pack controller 102 by driving the output of the AND gate low, thereby driving the first pack controller optical input 114 at the pack controller 102 low. In the depicted embodiment, a "low" optical input is represented by the optical signal being shut off, although in different embodiments (not depicted) a "low" optical signal may be a non-zero light level. In the depicted embodiment, when the safety fault signal is present, the system 100 operates in half-duplex mode; and when the safety fault signal is not present, the system 100 operates in full-duplex mode. In different embodiments (not depicted), the system 100 may operate in half-duplex mode even when the safety fault signal is not present. Additionally, in different embodiments (not depicted), the module controller processor 134 may not send an output signal to the safety override circuitry 136 in order to prevent a software error in the processor 134 from undesirably opening the switchgear 156. The module controller processor 134 may instead, for example, send an output signal to the pack controller 102 via a separate optical or electrical connection.

The second module controller UART 140 receives message data from the upstream module controller 104b via the second upstream optical input 188, which message data is sent to the module controller processor 134. The module controller processor 134 sends message data downstream towards the pack controller 102 via the third module controller UART 142, which is output using the second downstream optical output 194. The pack controller 102 receives message data transmitted by the module controller 104 along the dedicated message data communication channel via the second pack controller optical input 184 and the pack controller UART 146.

When the system 100 operates in half-duplex mode, the pack controller 102 does not send any message data using the safety return communication channel. Instead, the pack controller 102 uses the pack controller UART 146 to transmit message data to the first string of modules 104, with each of the modules 104 receiving that message data via the second downstream optical input 192, relaying it out the second upstream optical output 190, and relaying that data to the module controller processor 134 via the third module controller UART 142.

Examples of message data that the pack controller 102 may broadcast to the module controllers 104 comprise "commands" and "responses". Commands may comprise requests by the pack controller 102 for certain information available to the module controllers 104, and responses may comprise the data that the module controllers 104 provide to the pack controller 102 in response to the commands.

Examples of requests comprise a request for battery parameters as described above, a request to change module parameters or settings such as power modes (described in further detail below) and LED indicators, current data on the battery pack (e.g., instantaneous current being drawn by the load), cell voltage balancing targets, and instructions to enable use of an interactive diagnostic terminal of the module controller 104. More generally, commands may comprise any requests for data from one or more module controllers 104, instructions for one or more of the module controllers 104 to use certain data, instructions to configure or program one or more of the module controllers 104, and routing instructions for data such as in respect of FIG. 9B. The message data may additionally or alternatively be packetized.

Examples of responses the any one or more of the module controllers 104 may send to the pack controller 102 comprise responses to network management commands, responses to data requests from the pack controller 102 such as parameter or setting data and voltage and temperature data as described above, responses to alarm requests from the pack controller 102, and responses to the instructions from the pack controller 102 that enable use of the interactive diagnostic terminal of the module controller 104.

The first communication channel 172 in FIGS. 1B-1D and FIG. 2 is a loop in that a signal transmitted using the first communication channel 172 by the pack controller 102 can be returned to the pack controller 102 if none of the module controllers 104 detects a safety fault. However, in different embodiment (not depicted), the first communication channel 172 need not be a loop. For example, the first communication channel 172 may in a different embodiment be analogous to the dedicated message data communication channel in that it does not permit signals sent by the pack controller 102 to be returned to it on the same channel.

Figure 4:
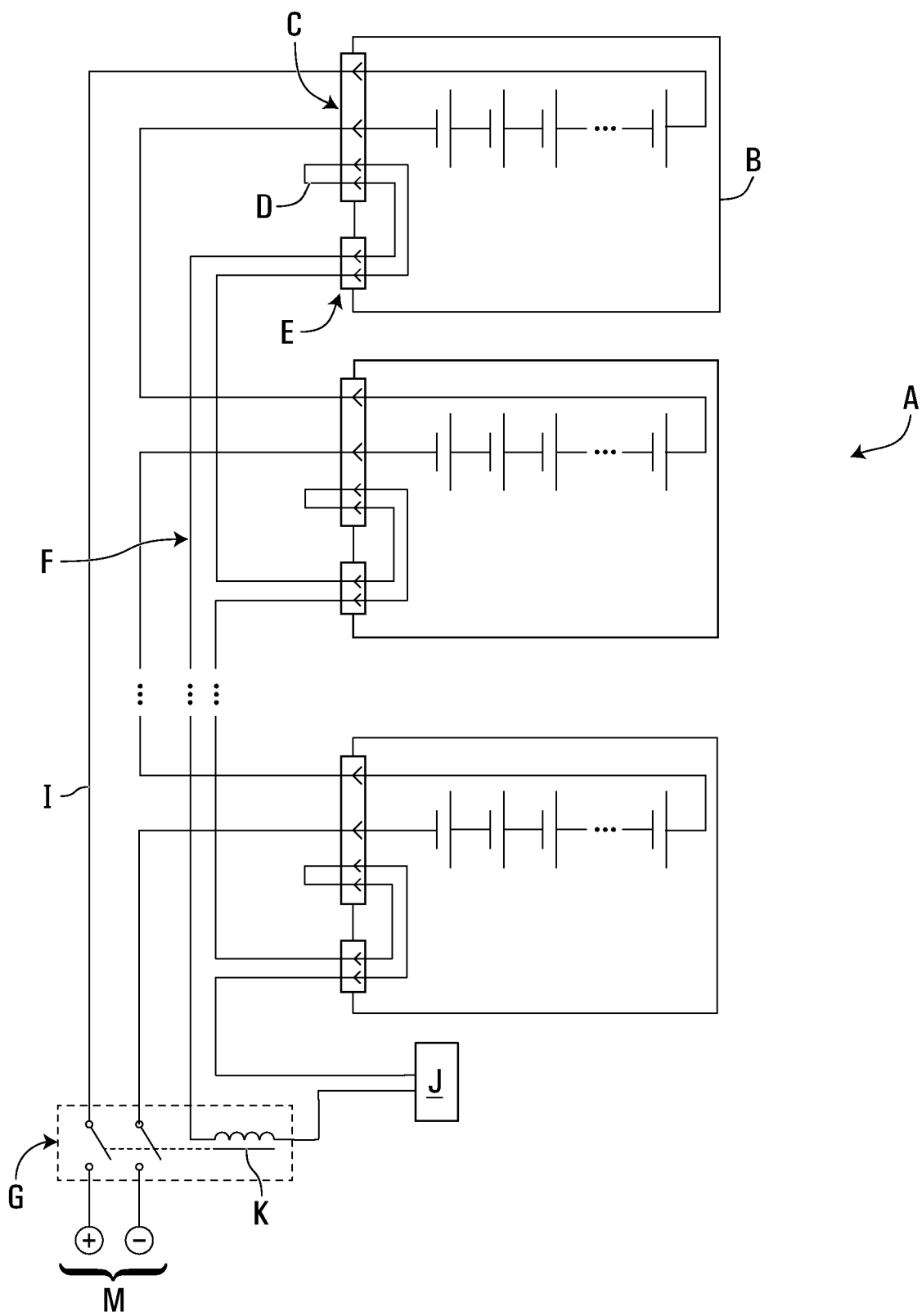
FIG. 4 is a schematic of a battery management system that implements a high voltage interlock loop, according to the prior art.

Referring now to FIG. 4, there is shown a schematic of a battery management system A that implements a high voltage interlock loop ("HVIL"), according to the prior art. The battery management system A comprises three battery modules B, each of which comprises multiple cells L electrically coupled together in series. The cells L of each of the modules are electrically coupled to a DC power bus I via a power connector C. A contactor power supply J controls a relay K that opens and closes contactors G that electrically couple (when the contactors G are closed) and decouple (when the contactors G are open) the power bus I to battery pack power terminals M.

An HVIL loop F that is electrically coupled to the contactor power supply J extends through each of the battery modules B; an HVIL connector E is the interface between the portion of the HVIL loop F contained in each of the modules B and the remainder of the HVIL loop F. Each of the modules B comprises the power connector C that, in addition to connecting the cells L to the power bus I, comprises an HVIL jumper D that electrically closes the HVIL loop F when the power connector C is connected to the remainder of the module B. When the power connector C is unconnected to the remainder of the module B, the cells L of that module are unconnected to the power bus I and the HVIL loop F is broken. When the HVIL loop F is broken, the contactor power supply J triggers the relay K, thereby disconnecting the modules B from the power bus I.

Figure 5:
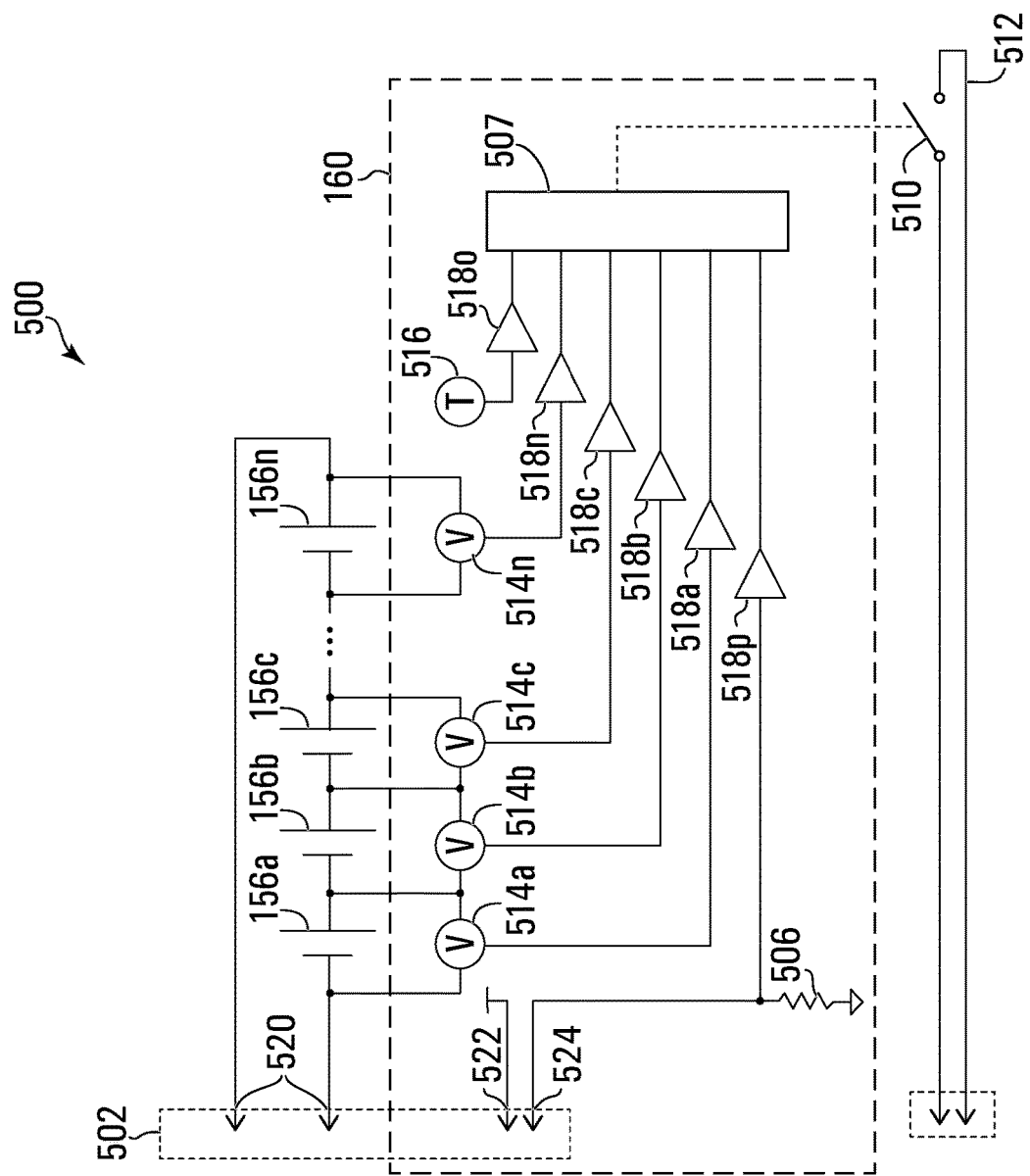
FIG. 5 is a schematic of a battery module comprising safety fault detection circuitry for generating an optical safety fault signal, according to another embodiment.

The system A of FIG. 4 is entirely electrical in nature, increasing the likelihood that electromagnetic interference will cause errors. In contrast, FIG. 5 shows a schematic of a battery module 500 comprising safety fault detection circuitry 160 for generating a fault detection signal and an optical safety fault signal that is used in place of the HVIL loop. In respect of the embodiment discussed in FIG. 2, the optical safety fault signal is transmitted along the safety return communication channel towards the pack controller 102 when the system 100 is in half-duplex mode.

The battery module 500 comprises multiple battery cells 156a,b,c . . . n (collectively, "battery cells 156") electrically coupled together in series and that are connectible via a pair of battery contacts 520 to the power bus (not shown in FIG. 5) via a power connector 502. The module 500 also comprises safety fault detection circuitry 160 that interfaces with the power connector 502 and the cells 156. The circuitry 160 comprises a first interlock contact 524 that is electrically coupled to an interlock signal line 525 and to logic gate circuitry 507 that in FIG. 5 is functionally equivalent to an OR logic gate. The circuitry 160 also comprises a second interlock contact 522 to which the first interlock contact 524 is only electrically shorted when the power connector 502 is connected to the battery module 500. In FIG. 5, the interlock signal line 525 is pulled-down to ground via a pull-down resistor 506 when the power connector 502 is unconnected to the module 500 and is shorted to $V_{CC}$ when the power connector 502 is connected to the module 500. A comparator 518p located along the interlock signal line 525 generates and sends the fault detection signal, which in this case is a digital high output, to the logic gate circuitry 507 when the interlock signal line 525 is shorted to $V_{CC}$ and otherwise does not send the fault detection signal to the logic gate circuitry 507.

In parallel with the interlock signal line 525, the battery module 500 comprises voltmeters 514a,b,c . . . n, each of which is electrically coupled across one of the cells 156a,b,c . . . n. Each of the voltmeters 514a,b,c . . . n is electrically coupled to the logic gate circuitry 507 via a signal line along which is located a comparator 518a,b,c . . . n. As with the interlock signal line 525, any one of the comparators 518a,b,c . . . n generates and sends the fault detection signal to the logic gate circuitry 507 when the voltmeters 518a,b,c . . . n measure that one of the cells 156a,b,c . . . n is in an overvoltage or undervoltage condition, and otherwise does not send the fault detection signal. The battery module 500 also comprises a temperature sensor 516 that is electrically coupled to the logic gate circuitry 507 via a signal line along which is located another comparator 518o, with the comparator 518o outputting the fault detection signal to the logic gate circuitry 507 when the temperature sensor measures an overtemperature condition and otherwise does not send the fault detection signal. Each of the comparators 518a . . . o may be implemented, for example, using an operational amplifier.

While the battery module 500 of FIG. 5 generates the safety fault signal in response to any one or more of the power connector 502 being unconnected, an overvoltage condition, an undervoltage, and an overtemperature condition, in different embodiments (not depicted) the safety fault signal may be generated only if any one or more of these criteria is satisfied. Additionally or alternatively, in different embodiments (not depicted), the battery module 500 may generate the safety fault signal in response to any one or more of the module 500 losing communication with any of the other module controllers 104 or the pack controller 102, and failure of the module processor 134.

After receiving at least one fault detection signal, the logic gate circuitry 507 outputs the safety fault signal, which in turn actuates an electro-optical transmitter (not shown in FIG. 5, but such as the module controller electro-optical transmitter 148) via a switch 510. The electro-optical transceiver outputs an optical signal along an optical conduit 512, such as optical fiber. In the context of FIG. 2, the optical conduit 512 comprises the optical transmission medium from any one of the modules 104 downstream towards the pack controller 102 along the safety return communication channel when a safety fault has occurred on that module 104.

BMS Operation

Figure 3A:
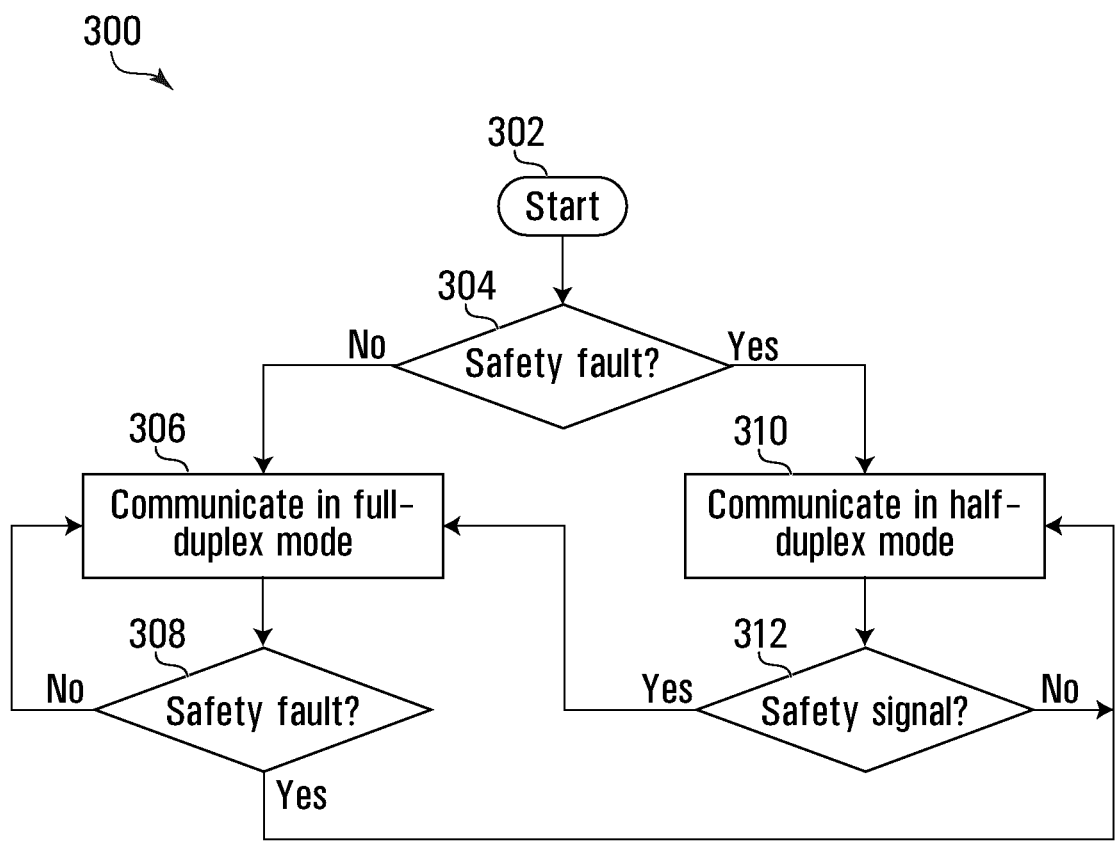
FIG. 3A is a flowchart depicting a method for communicating using the battery management system, according to another embodiment.

FIG. 3A depicts a method 300 for communicating using the battery management system 100 of FIG. 2, according to another embodiment. Portions of the method 300 that are implemented using the pack controller processor 108 and the module controller processor 134 may be encoded as computer program code and stored on the pack controller memory (not shown) and module controller memory (not shown), as appropriate.

The method 300 beings at block 302 and proceeds to block 304 where the pack controller 102 determines whether a safety fault has occurred. In certain embodiments, the pack controller processor 108 plays no role in determining whether a safety fault has occurred in order to eliminate the likelihood that a software error may prevent a fault's detection or the remedial action taken in response to a fault's detection. Instead, detection of the safety fault is handled entirely in hardware. In the depicted embodiment, the safety return circuitry 152 in the form of the watchdog timer 120 monitors whether there is any change in the signal the pack controller 102 receives at the first pack controller optical input 114. As discussed in further detail below, when a fault has already been detected and the system 100 is consequently operating in half-duplex mode, the pack controller 102 sends a safety signal generated by the safety loop signal generator 110 along the safety return communication channel. In the event none of the module controllers 104 is experiencing a safety fault, the safety signal is relayed through the string of module controllers 104 to the watchdog timer 120, which detects the change in the signal and determines the safety fault is over. In contrast, and also as discussed in further detail below, when the system 100 is in full-duplex mode the pack controller processor 108 is configured to send message data to the modules 104 more frequently than the timeout period of the watchdog timer 120, including by sending "no operation" messages if no other message data is available or desired to be transmitted, to at least prevent the watchdog timer 120 from determining a fault condition exists.

Figure 3B:
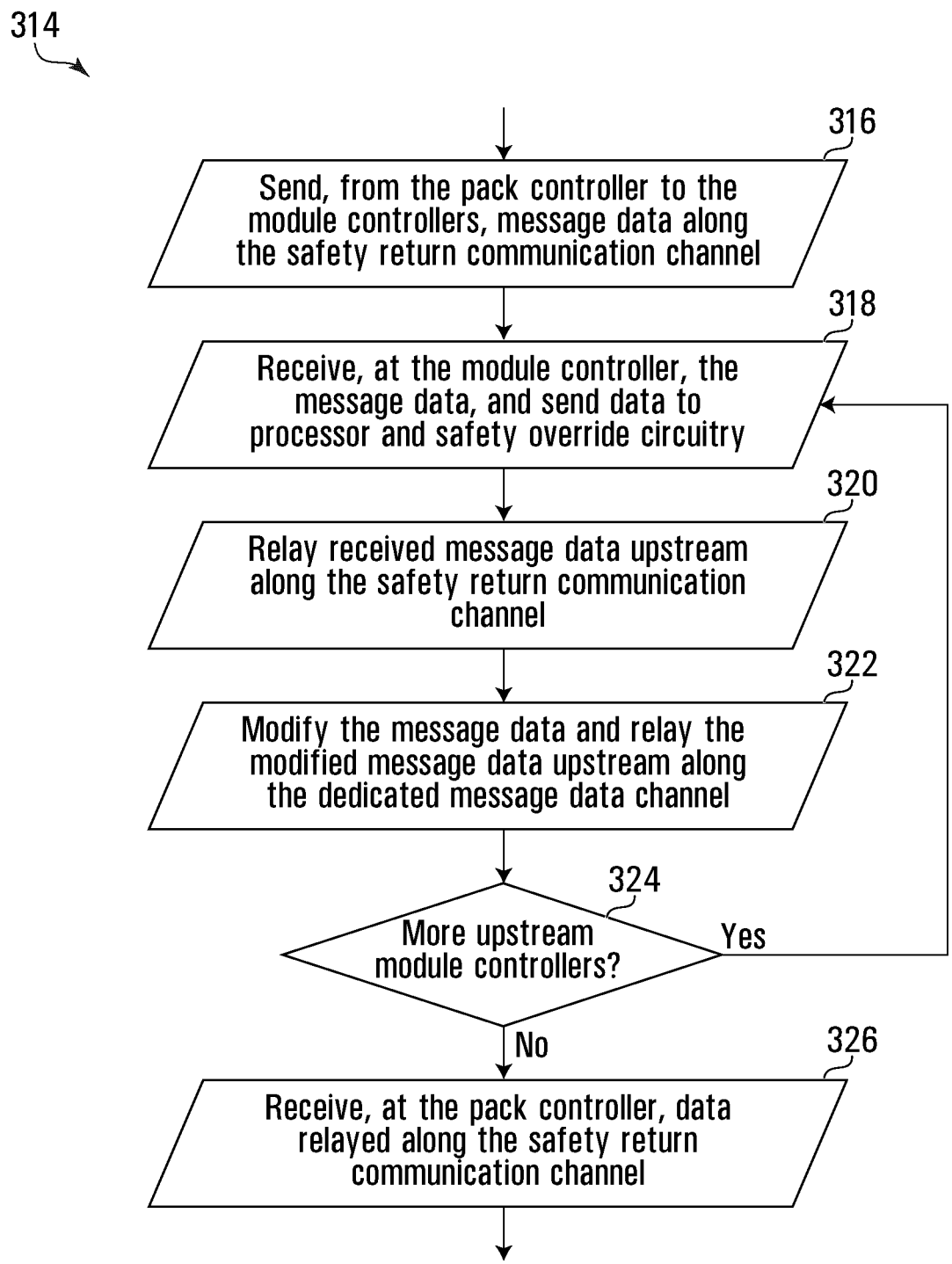
FIGS. 3B and 3C are flowcharts depicting methods for communicating using full-duplex communication and half-duplex communication, respectively, using the battery management system, according to additional embodiments.

Assuming the watchdog timer 120 detects a variation prior to the expiry of its timeout period in the signal received along the safety return communication channel, the pack controller 102 concludes that there is no fault condition in the system 100 and moves to block 306 where it operates in full-duplex mode. FIG. 3B shows an example method 314 performed by the battery management system 100 to send message data in full-duplex mode.

In FIG. 3B, at block 316 the pack controller processor 108 sends message data to the module controllers 104 using the safety return communication channel; this sent message data may, for example, instruct the module controllers to go into a low power mode, exit the low power mode, or send data representing battery module state such as cell temperature or voltage, or any commands as described below in respect of FIGS. 7A-10B. In the depicted embodiment, when the module controllers 108 exit low power mode they enter normal power mode; however, in different embodiments (not depicted), any one or more of the module controllers 104 may enter a different mode upon exiting low power mode. The pack controller processor 108 does this by adjusting the selection input of the first multiplexer 106a so that it outputs data sent by the second multiplexer 106b, and by adjusting the selection input of the second multiplexer 106b so that it outputs data sent by the pack controller UART 146. This message data is optically transmitted to the second module controller 104b. At block 318, the module controller 104b receives and converts the optical signal back into an electrical signal, sends the received message data to the input of the safety override circuitry 136 in the form of the AND gate, and sends the received message data to the first module controller UART 138. As there is no safety fault in full-duplex mode, at block 320 the second module controller 104b via the AND gate relays the message data it receives from the pack controller 102 via the safety return communication channel as-is to the first module controller 104a using the safety return communication channel. At block 322, the module controller processor 134 on the second module controller 104b sends the same or different message data and transmits this message data to the first module controller 104a via the third module controller UART 142. For example, the message data sent from the second module controller 104b to the first module controller 104a may comprise a response to a request from the pack controller 102. For example, where the pack controller 102 requests that the module controllers 104 provide temperature information, the module controller 104a may transmit its temperature information to the next module controller 104a via the dedicated message data communication channel such that the pack controller 102 eventually receives temperature data from all the module controllers 104 comprising the string of module controllers 104.

At block 324, blocks 318-322 are repeated by the next downstream module controller 104a in the string until the data transmitted along both the safety return and dedicated message data communication channels propagates back to the pack controller 102 at block 326.

After block 326, the method 300 continues to block 308 as shown in FIG. 3A where the pack controller 102 determines whether it detects a safety fault in any of the module controllers 104 by assessing whether the watchdog timer 120 has expired. If no, the method 300 returns to block 306 and again transmits data in full-duplex mode. However, if a fault is detected the method 300 proceeds to block 310 where data is transmitted in half-duplex mode.

Figure 3C:
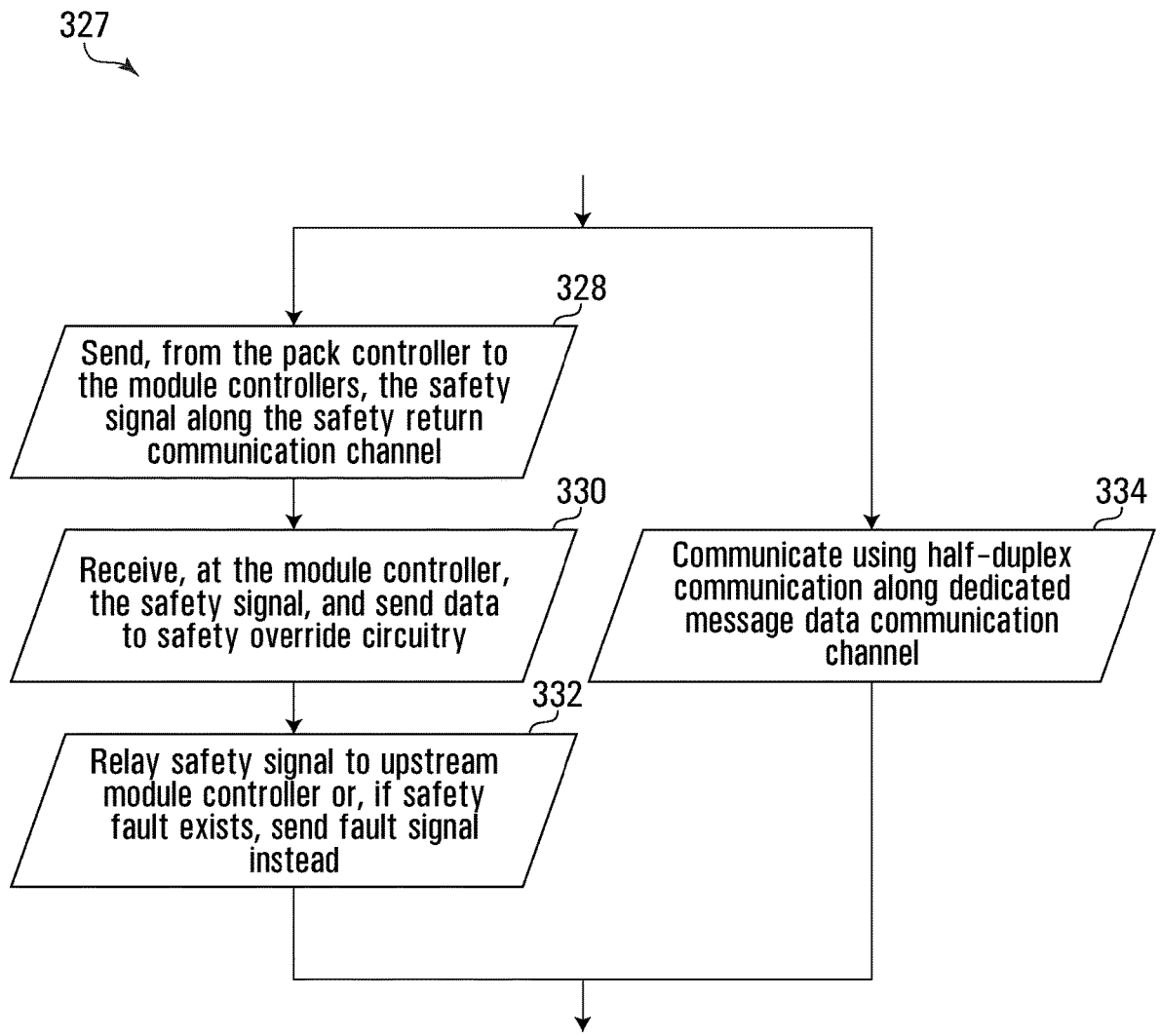

FIG. 3C shows an example method 327 performed by the battery management system 100 to send message data in half-duplex mode. At block 328, the pack controller processor 108 outputs the safety signal from the pack controller 102 to the string of modules 104. The safety loop signal generator 110 generates the safety signal independently of the pack controller processor 108, and the pack controller processor 108 actuates the selection input of the first multiplexer 106a so that the safety signal, as opposed to message data from the pack controller UART 146, is optically transmitted along the safety return communication channel to the string of modules 104. At block 330, the second module controller 104b receives the safety signal and converts it into an electrical signal. At block 332, the safety signal is relayed via the safety override circuitry 136 to the first module controller 104a, assuming that the second module controller 104b is not experiencing a safety fault. If the second module controller 104b is experiencing a safety fault, the safety signal terminates at the second module controller 104b.

While the safety signal is being transmitted along the safety return communication channel, at block 334 the pack controller processor 108 is engaged in half-duplex communication with the string of modules 104 using the dedicated message data communication channel. The pack controller processor 108 controls the selection input of the pack controller UART 146 so that message data is transmitted to the module controllers 104 via each module controller's 104 downstream message data input 132. Each message data that each of the module controllers 104 receives is received by the third module controller UART 142 and is also passed through to any upstream module controllers 104 via the second upstream optical output 190. Analogously, communication from the module controllers 104 to the pack controller 102 is also done using the dedicated message data communication channel in the opposite direction. That is, a transmission begins at the third module controller UART 142 of an upstream module controller 104b and is optically transmitted to a downstream module controller 104a, where it is converted to an electrical signal and received by the second module controller UART 140 of the downstream module controller 104a. As in full-duplex mode, the message data sent by the downstream module controller 104a may be different from what it receives. The message data eventually propagates to the pack controller 102 and, more specifically, is received by the pack controller UART 146. In the depicted embodiment, the UARTs 140,142,146 permit only serial communication, so the dedicated message data communication channel is used at any given time to transmit data to the pack controller 102 or the module controllers 104, but not both; in different embodiments, however, the dedicated message data channel may be constructed using communication circuitry capable of parallel and full-duplex transmissions.

After block 334, the method 300 proceeds to block 312 in FIG. 3A and determines whether the safety signal has been detected by the pack controller 102. If the watchdog timer 120 has timed out, at least one of the module controllers 104 in the string of module controllers 104 is still experiencing a safety fault, and the method accordingly returns to block 310 and remains in half-duplex mode. Alternatively, if the watchdog timer 120 detects the safety signal, none of the module controllers 104 is experiencing a safety fault and the method 300 proceeds to block 306 where transmission can be done using higher bandwidth full-duplex mode.

While FIGS. 3B and 3C describe the system 100 operating in half-duplex or full-duplex mode, in different embodiments (not depicted) one or both communication channels may be used to send data unidirectionally (i.e., in a simplex mode).

In one embodiment, each of the module controller processors 134 is operable in a low power mode and a normal power mode in which the processors 134 use more power, and have more functionality, than when in low power mode. For example, the processors 134 may operate in low power mode when the load to which the battery pack is electrically coupled is not drawing current, thereby rendering unnecessary frequent sampling of battery parameters such as cell voltage and module temperature. In this example, when in low power mode each of the processors 134 samples battery parameters at a first frequency in contrast to when the processors 134 are in normal power mode and the load is drawing current, in which case the processors 134 each sample the battery parameters at a second frequency greater than the first frequency.

In one example embodiment, the pack controller processor 108 determines whether the load is drawing current by determining the state of the switchgear 158. If the switchgear 158 has electrically decoupled the cells 156 from the load for a reason other than at least one of the battery modules 104 being in a fault state, the pack controller processor 108 sends message data to the module controller processors 134 instructing them to enter low power mode. The switchgear 158 may be open even absent a fault condition if, for example, the system's 100 user manually overrides switchgear operation. Once the switchgear 158 electrically couples the cells 156 to the load, the pack controller processor 108 sends message data to the module controller processors 134 instructing them to enter normal power mode.

In one embodiment, during initialization of the system 100, the pack controller processor 108 sends message data over the dedicated message data communication channel in half-duplex mode, instructing the module controllers 104 to transition from low power mode to normal power mode. The pack controller processor 108 also initializes the module controllers 104 by assigning network addresses to each of the module controllers 104 by communicating in half-duplex mode over the dedicated message data communication channel. Once all of the module controllers 104 have been assigned addresses and all of the module controller processors 134 are in normal power mode, the pack controller processor 108 begins communicating in full-duplex mode and sends message data using the safety return communication channel. To shut down the system 100, the pack controller processor 108 sends a message using either the safety return communication channel or the dedicated message data communication channel instructing the module controller processors 108 to enter low power mode.

In another embodiment (not depicted), any one or more of the module controllers 104 may enter low power mode without being expressly commanded by the pack controller 102 to do so. For example, any one or more of the module controllers 104 may enter low power mode if they haven't received a transmission along the first communication channel 172 for a first timeout period, the second communication channel 177 for a second timeout period, or both. The first and second timeout periods may be identical or they may differ. In these embodiments, the module controllers 104 exit low power mode upon receiving a transmission along one or both of the first and second communication channels 172, 177.

Figure 6:
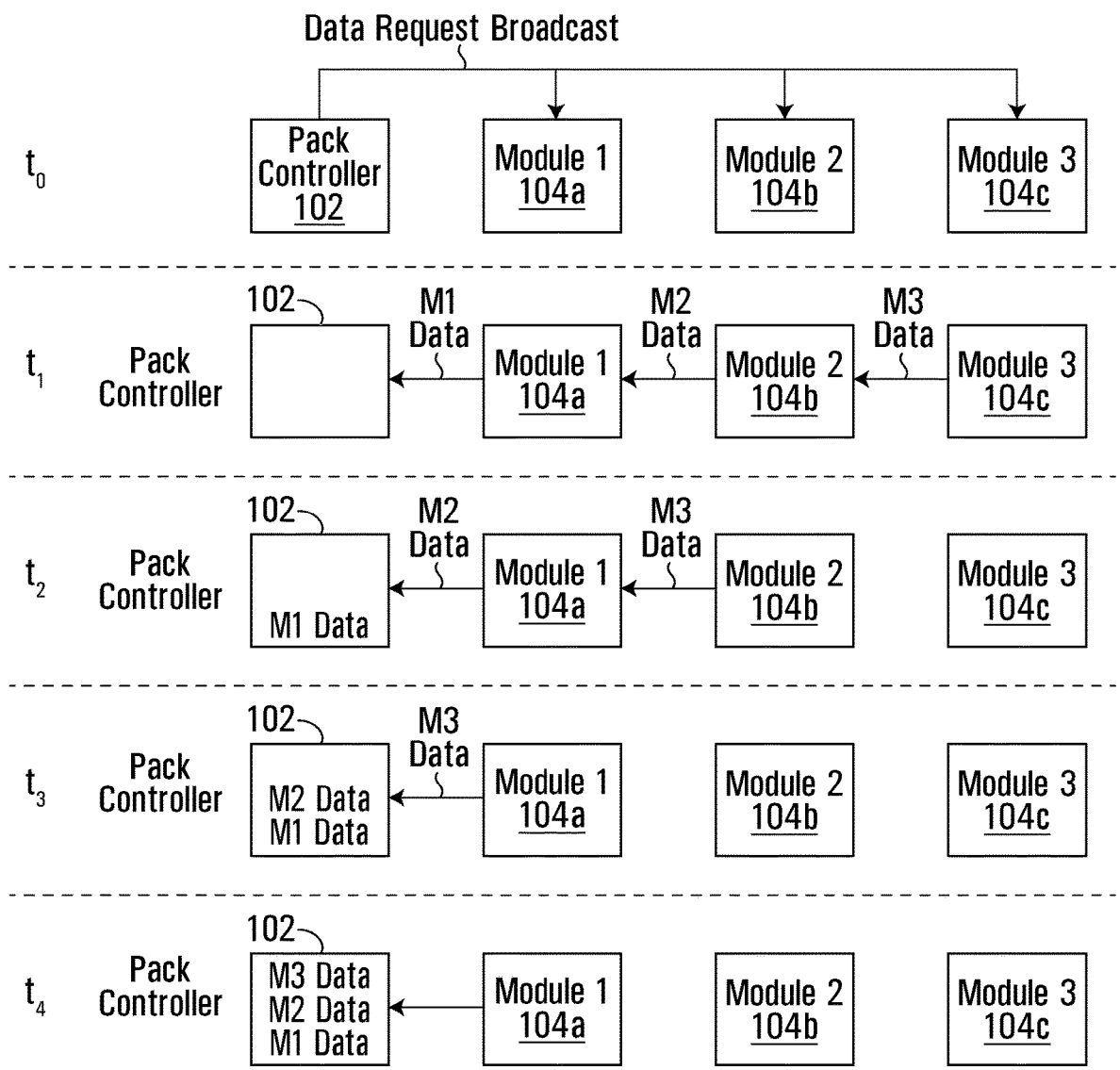
FIG. 6 depicts the timing of message data as it propagates along a string of the module controllers towards the pack controller, according to another embodiment.

FIG. 6 depicts the timing of message data as it propagates along a string of the module controllers 104 towards the pack controller 102. FIG. 6 depicts an exchange in which the pack controller 102 broadcasts a request for data to all of the module controllers 104 on a string, and in which the module controllers 104 subsequently respond and propagate data downstream to the pack controller 102.

In FIG. 6, the pack controller 102 is communicatively coupled to a string of module controllers 104 comprising first through third module controllers named MODULE 1, MODULE 2, and MODULE 3, respectively, in FIG. 6. MODULE 1 is the most downstream module controller 104a, MODULE 3 is the most upstream module controller 104c, and MODULE 2 is the module controller 104b located between MODULES 1 and 3. FIG. 6 applies to the system 100 regardless of whether it is operating in half-duplex or full-duplex mode.

At time $t_0$, the pack controller 102 broadcasts a data request message to all of the module controllers 104. The data request may be for each of the module controllers 104 to provide temperature or cell voltage data, for example.

At time $t_1$, after receiving the data request message each of the module controllers 104 generates response data: MODULE 3 generates the M3 DATA, MODULE 2 generates the M2 DATA, and MODULE 1 generates the M1 DATA. Each of the module controllers 104 sends the data it generates downstream to the pack controller 102 or module controller immediately downstream of it.

At time $t_2$, the pack controller 102 receives the M1 DATA, MODULE 1 receives and relays the M2 DATA to the pack controller 102, and MODULE 2 receives and relays the M3 data to MODULE 1.

At time $t_3$, the pack controller 102 receives the M2 DATA and MODULE 1 receives and relays the M3 data to MODULE 1.

At time $t_4$, the pack controller 102 receives the M3 data from MODULE 1.

Data sent by an upstream module controller 104 accordingly propagates through any module controllers 104 that intervene between that upstream module controller 104 and the pack controller 102 until reaching the pack controller 102.

Referring now to FIGS. 7A-10B, there are shown figures depicting message data propagating through the embodiment of the battery management system 100 depicted in FIGS. 1E and 1F. In each of FIGS. 7A-10B, the first and second communication channels 172,177 are each used for simplex communication downstream from the third module controller 104c to the pack controller 102, and the first communication channel 172 is used to transmit the safety signal from the pack controller 102 to the third module controller 104c and to relay the safety signal back to the pack controller 102 in the event the system 100 is not experiencing a safety fault. The safety override circuitry 136 in the module controllers 104 may comprise an AND gate having inputs connected to the first communication channel 172, the module controller processor 134, and the safety fault detection circuitry 160. In different embodiments (not depicted), the module controller processor 134 and the safety fault detection circuitry 160 may be combined, or the module controller processor 134 may be omitted entirely; in those embodiments, the inputs of the AND gate may consequently not be separately connected to the module controller processor 134 and the safety fault detection circuitry 160.

As discussed above, the message data transmitted using the embodiments of FIGS. 7A-10B may comprise commands sent by the pack controller 102 and responses sent by one or more of the module controllers 104. Each of FIGS. 7A, 8A, and 9A, depict embodiments in which the pack controller 102 of FIG. 1E is operating in the normal state due to none of the module controllers 104 having detected a safety fault, while FIG. 10A depicts an embodiment in which the pack controller 102 of FIG. 1F is operating in the normal state. In contrast, each of FIGS. 7B, 8B, and 9B depict embodiments in which the pack controller 102 of FIG. 1E is operating in a fault state due to at least one of the module controllers 104 having detected a safety fault, while FIG. 10B depicts an embodiment in which the pack controller 102 of FIG. 1F is operating in the fault state.

In the embodiment of FIGS. 7A and 7B, regardless of whether the pack controller 102 is in the fault state the pack controller 102 transmits the safety signal and message data comprising commands along the first communication channel 172. As described above, when the safety return circuitry 152 comprises the watchdog timer 120, the pack controller processor 108 may use the commands as the safety signal and ensure that the commands vary more frequently than the timeout period of the watchdog timer 120. In different embodiments (not depicted), the safety signal and the message data may differ and may be multiplexed on the first communication channel 172.

Also regardless of whether the pack controller 102 is in the fault or normal state, the module controllers 104 transmit any responses to the commands along the second communication channel 177, all of the module controllers 104 automatically forward to the second module controller electro-optical transmitter 196 all data received at the second module controller electro-optical receiver 198, and all the module controllers 104 automatically perform any commands they receive regardless of whether they are received on the first or second communication channel 172,177.

When the pack controller 102 is in the normal state as in FIG. 7A, the safety signal and commands from the pack controller 102 are transmitted to the module controllers 104 only along the first communication channel 172. The responses from the module controllers 104 are transmitted only along the second communication channel 177, with each of the module controllers 104 relaying downstream any upstream packets it receives along the second communication channel 177 as well as sending downstream any responses to the commands it receives along the first communication channel 172. In this way, the pack controller 102 sends commands along the first communication channel 172 and receives responses from the module controllers 104 along the second communication channel 177.

In FIG. 7B, the second module controller 104b is experiencing a safety fault, and the safety override circuitry 136 consequently prevents the commands from being relayed downstream along the first communication channel 172. The module controller processor 134 of the second module controller 104b forwards the commands from the first communication channel 172 to the second communication channel 177 where they are sent downstream to the first module controller 104a. The module controller processor 134 of the second module controller 104b also sends its response to the commands it receives along the first communication channel 172 downstream along the second communication channel 177. In this way, regardless of whether the pack controller 102 is in the normal or fault state, it sends commands along the first communication channel 172 and receives the module controllers' 104 responses along the second communication channel 177. In FIGS. 7A and 7B, for each of the module controllers 104, the module controller processor 134 determines whether or not the module controller 104 has experienced a safety fault and responds accordingly.

Figures 8A, 8B:
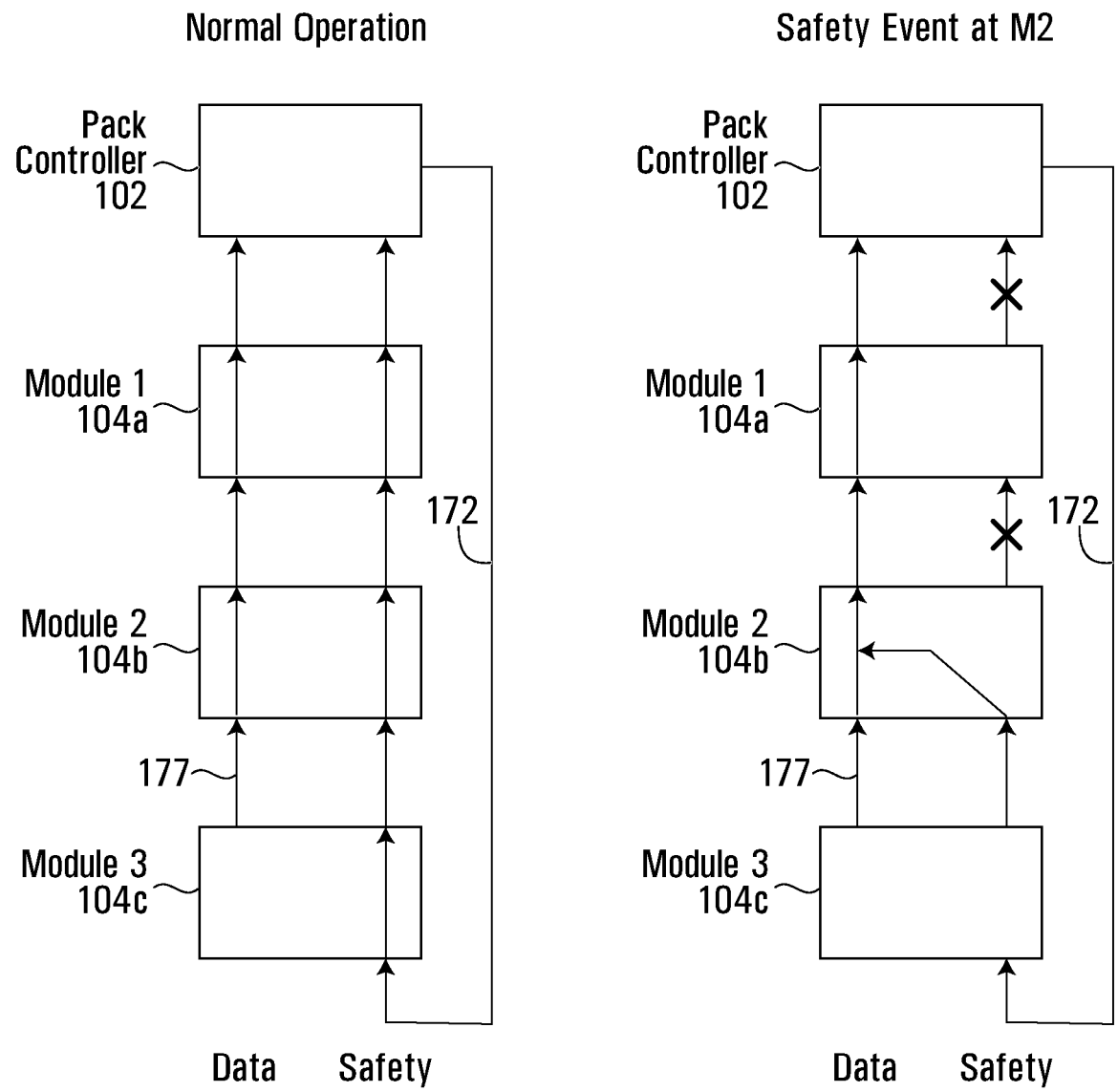

FIGS. 8A and 8B depict another embodiment of the system 100. As with the embodiment of FIGS. 7A and 7B, in FIGS. 8A and 8B regardless of whether the pack controller 102 is in the fault state the pack controller 102 transmits the safety signal and message data comprising commands along the first communication channel 172, the module controllers 104 transmit any responses to the commands along the second communication channel 177, and all the module controllers 104 automatically perform any commands they receive regardless of whether they are received on the first or second communication channel 172,177. However, unlike in FIGS. 7A and 7B the module controllers 104 of FIGS. 8A and 8B automatically forward all packets received along the first communication channel 172 to the second communication channel 177 for transmission downstream. All module controllers 104 also forward packets received along the second communication channel 172 downstream, except that the module controllers 104 filter out duplicate packets in order to conserve bandwidth. For example, in FIG. 8A the second module controller 104b forwards commands from the first communication channel 172 to the second communication channel 177, and filters out the identical commands that were previously forwarded by the third module controller 104c.

In FIG. 8B, the second module controller 104b is experiencing a safety fault, and the safety override circuitry 136 consequently prevents the commands from being relayed downstream along the first communication channel 172. However, because the second and third module controllers 104b,c each receives and forwards commands from the first communication channel 172, those commands are nonetheless transmitted to the first module controller 104a via the second communication channel 177. As mentioned above, the second module controller 104b filters out the duplicate commands it receives along the second communication channel 177 from the third module controller 104c. In a different embodiment (not depicted), however, any one or more of the module controllers 104 may not filter out duplicate commands in the event saving bandwidth is not a priority.

FIGS. 9A and 9B depict another embodiment of the system 100. As in the embodiment of FIGS. 7A and 7B, regardless of whether the pack controller 102 is in the fault state the pack controller 102 transmits the safety signal and message data comprising commands along the first communication channel 172, the module controllers 104 transmit any responses to the commands along the second communication channel 177, all of the module controllers 104 automatically forward to the second module controller electro-optical transmitter 196 all data received at the second module controller electro-optical receiver 198, and all the module controllers 104 automatically perform any commands they receive regardless of whether they are received on the first or second communication channel 172,177. The operation of the system 100 as depicted in FIG. 9A when the pack controller 102 is in the normal state is also identical to the operation of the system 100 as depicted in FIG. 7A.

FIG. 9B depicts an example of the system 100 of FIGS. 9A and 9B when the pack controller 102 is in fault mode. In FIG. 9B, the second module controller 104b is experiencing a safety fault and consequently does not relay the commands it receives along the first communication channel 172 to the first module controller 104a. The pack controller 102 subsequently sends a command to the third module controller 104c to forward the commands it receives via the first communication channel 172 to the second communication channel 177. Any module controllers 104 downstream of the second module controller 104b consequently receive the commands via the second communication channel 177.

In FIGS. 9A and 9B, the module controller processors 134 are unaware of whether any of the module controllers 104 are experiencing a safety fault. The pack controller processor 108 accordingly determines which of the module controllers is affected by the safety fault and reacts accordingly. For example, in FIG. 9B the first module controller 104a does not receive any commands or the optical safety signal from the pack controller processor 108; consequently, it does not respond to any commands that the pack controller processor 108 sends. The pack controller 102, however, does receive responses from the second and third module controllers 104b,c, which are upstream of the first module controller 104b. The pack controller processor 108 accordingly concludes that either the first module controller 104b is experiencing a safety fault or is not receiving the processor's 108 commands (e.g., the first communication channel 172 between the first and second communication channels 172 may be broken, or the second module controller 104b may be experiencing a fault [safety or otherwise] that prevents it from sending transmissions along the first communication channel 172). In the event that the second module controller 104b is experiencing a fault, the pack controller processor 108 in FIG. 9B commands the third module controller 104b to forward the message data from the first communication channel 172 to the second communication channel 177 so that the first module controller 104a can receive and process the message data, which may comprise commands requesting a response.

In the embodiment of FIG. 9B, the third module controller 104b forwards all data, including the safety signal, to the second communication channel 177. However, in a different embodiment (not depicted), the third module controller 104b may forward only the optical message data excluding the safety signal, or may forward only a subset of that message data (e.g., commands from the pack controller processor 108). Additionally, in a different embodiment (not depicted), the pack controller processor 108 may command the second module controller 104b to forward the message data instead.

While in FIG. 9B the pack controller 102 instructs the third module controller 104c to forward the commands to the second communication channel 177, in different embodiments (not depicted) the pack controller 102 may instruct any of the module controllers 104 upstream of the module controller 104 experiencing the safety fault to forward the commands it receives along the first communication channel 172 to the second communication channel 177.

FIGS. 10A and 10B depict another embodiment of the system 100. As in the embodiment of FIGS. 7A and 7B, regardless of whether the pack controller 102 is in the fault state the pack controller 102 transmits the safety signal along the first communication channel 172, the module controllers 104 transmit any responses to the commands along the second communication channel 177, all of the module controllers 104 automatically forward to the second module controller electro-optical transmitter 196 all data received at the second module controller electro-optical receiver 198, and all the module controllers 104 automatically perform any commands they receive regardless of whether they are received on the first or second communication channel 172,177. In FIGS. 10A and 10B, no cross-channeling (i.e., forwarding of packets from one of the communications channels 172,177 to the other) is required, and the processors 134 need not be configured to handle any duplicate packets.

In FIG. 10A when the pack controller 102 is in the normal state, the pack controller 102 transmits commands along the first communication channel 177. The commands may concurrently act as the safety signal as described above in respect of FIGS. 7A-9B, or the safety signal and the commands may be different signals. When any one of the module controllers 104 experiences a safety fault, as the second module controller 104b does in FIG. 10B, that module controller 104 ceases to relay the safety signal along the first communication channel 172 and the pack controller 102 subsequently sends the commands along the second communication channel 177. In certain embodiments, the second communication channel 177 is only active when the pack controller 102 is in the fault state.

As discussed above, in both half-duplex and full-duplex modes the module controllers 104 receive and send data from and to the pack controller 102 asynchronously. In different embodiments (not depicted), one or both of the receipt and transmission of data may be synchronous, either between any one or more of the module controllers 104, between the string of module controllers 104 and the pack controller 102, or both.

In some of the foregoing embodiments, the pack controller 102 comprises the watchdog timer 120 that comprises part of the safety return circuitry 152. In different embodiments (not depicted), any one or more of the module controllers 104 may also comprise the watchdog timer 120 or analogous circuitry that is communicatively coupled to the first communication channel 172 to determine whether they are receiving the optical safety signal. In these embodiments, if the watchdog timer 120 on any of the module controllers 104 expires, that module controller 104 may conclude that it is experiencing a safety fault.

Furthermore, in some of the foregoing embodiments the optical message data sent by the module controllers 104 to the pack controller 102 is sent in response to a command from the pack controller 102. However, in different embodiments (not depicted), any of the foregoing embodiments may be modified so that any one or more of the module controllers 104 transmits the optical message data to the pack controller 102 even if the pack controller 102 has not requested that data. For example, any one or more of the module controller processors 134 may be configured to periodically or from time to time send data, such as any of the data that is described as comprising the responses above, to the pack controller processor 108 without being commanded to by the pack controller processor 108.

While the processors 108,134 is used in the foregoing embodiments, in alternative embodiments (not depicted) one or both of the processors 108,134 may instead be, for example, a microprocessor, controller, microcontroller, programmable logic controller, field programmable gate array, or an application-specific integrated circuit. Examples of computer readable media are non-transitory and comprise disc-based media such as CD-ROMs and DVDs, magnetic media such as hard drives and other forms of magnetic disk storage, and semiconductor based media such as flash media, SSDs, random access memory, and read only memory. Furthermore, while in the depicted embodiments the pack controller 102 is shown as comprising single pack controller processor 108 and each of the module controllers 104 is shown as comprising a single module controller processor 134, in different embodiments (not depicted) the functionality described as being performed by any one or more of these processors 108,134 may be divided between multiple processors.

Directional terms such as "top", "bottom", "upwards", "downwards", "vertically", and "laterally" are used in this description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. Furthermore, as used in this description the singular forms "a", "an", and "the" are intended to include the plural forms as well, unless the context clearly indicates otherwise.

FIGS. 3A-3C are flowcharts of example methods. Some of the blocks illustrated in the flowcharts may be performed in an order other than that which is described. Also, it should be appreciated that not all of the blocks described in the flowcharts are required to be performed, that additional blocks may be added, and that some of the illustrated blocks may be substituted with other blocks.

For the sake of convenience, the example embodiments above are described as various interconnected functional blocks. This is not necessary, however, and there may be embodiments where these functional blocks are equivalently aggregated into a single logic device, program or operation with unclear boundaries; alternatively, there may be embodiments in which these functional blocks are divided into multiple logic devices, programs, or operations. In any event, the functional blocks can be implemented by themselves, or in combination with other pieces of hardware or software.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A module controller comprising part of a battery module, the module controller comprising:
   (a) a downstream electro-optical transmitter for receiving a transmitted electrical signal and configured to convert the transmitted electrical signal into a transmitted optical signal, the transmitted optical signal comprising optical message data;
   (b) signal generation circuitry communicatively coupled to the downstream electro-optical transmitter and configured to generate the transmitted electrical signal, the transmitted electrical signal comprising electrical message data;
   (c) signal processing circuitry configured to process a received electrical signal;
   (d) a downstream electro-optical receiver for receiving a received optical signal from a pack controller and configured to convert the received optical signal into a received electrical signal for processing by the signal processing circuitry;
   (e) a module controller processor communicatively coupled to the downstream electro-optical receiver and transmitter;
   (f) a module controller memory communicatively coupled to the processor, the memory having stored thereon computer program code executable by the processor to cause the processor to process the received electrical signal and to generate the transmitted electrical signal; and
   (g) an upstream electro-optical transceiver communicatively coupled to the processor for receiving the optical message data from and transmitting the optical message data to an upstream module controller,
   wherein the upstream electro-optical transceiver is configured to convert between the optical message data and the electrical message data, and
   wherein the computer program code further causes the processor to receive and transmit the optical message data from and to the upstream module controller by receiving and transmitting the electrical message data from and to the upstream electro-optical transceiver, respectively.

2. The module controller of claim 1 wherein the transmitted optical signal comprises message data indicative of a state of the battery module, and the received optical signal comprises message data requesting the state of the battery module.

3. The module controller of claim 1 wherein the transmitted optical signal comprises message data indicative of a state of the battery module, and the module controller transmits the message data absent a request from the pack controller to do so.

4. The module controller of claim 1 wherein the computer program code further causes the processor to communicate using half-duplex communication.

5. The module controller of claim 1 wherein the computer program code further causes the processor to communicate using full-duplex communication.

6. The module controller of claim 1 wherein the downstream electro-optical receiver comprises part of a first communication channel and the downstream electro-optical transmitter comprises part of a second communication channel.

7. The module controller of claim 1 wherein the downstream electro-optical transmitter and receiver comprise part of a single communication channel.

8. The module controller of claim 1 wherein the computer program code further causes the processor to relay the optical message data received from the upstream module controller at the upstream electro-optical transceiver to the downstream electro-optical transmitter for transmission to the pack controller.

9. The module controller of claim 1 wherein:
   (a) the received signal comprises an optical safety signal from the pack controller and the downstream electro-optical receiver is configured to convert the optical safety signal into an electrical safety signal;
   (b) the transmitted optical signal comprises an optical safety fault signal and the downstream electro-optical transmitter is configured to convert an electrical safety fault signal into the optical safety fault signal; and
   (c) the signal generation circuitry and signal processing circuitry comprise:
      (i) safety fault detection circuitry configured to generate a fault detection signal in response to detecting a safety fault on the battery module; and
      (ii) safety override circuitry communicatively coupled to the downstream electro-optical receiver, downstream electro-optical transmitter, and safety fault detection circuitry, wherein the safety override circuitry is configured to transmit the electrical safety fault signal to the downstream electro-optical transmitter in response to the fault detection signal.

10. The module controller of claim 9 wherein the fault detection signal and the electrical safety fault signal are identical.

11. The module controller of claim 9 wherein the optical safety fault signal is sent to a watchdog timer on the pack controller and comprises a constant signal that is held constant for longer than a timeout period of the watchdog timer.

12. The module controller of claim 9 wherein the safety fault detection circuitry comprises:
   (a) a first interlock contact to which a power connector is connectable, wherein the power connector is also connected to a pair of battery contacts electrically coupled to a battery cell comprising part of the battery module when connected to the first interlock contact and is unconnected to the pair of battery contacts when unconnected to the first interlock contact; and (b) an interlock signal line communicatively coupled to the first interlock contact, wherein the fault detection signal is transmitted along the interlock signal line when the power connector is unconnected and is otherwise not transmitted along the interlock signal line.

13. The module controller of claim 12 further comprising a second interlock contact to which the first interlock contact is electrically coupled when the power connector is connected and is electrically uncoupled when the power connector is unconnected, wherein the interlock signal line is pulled-up or pulled-down to the fault detection signal when the power connector is unconnected and is shorted to the second interlock contact that outputs a signal different from the fault detection signal when the power connector is connected.

14. The module controller of claim 12 wherein the safety fault detection circuitry further comprises at least one of a voltmeter electrically coupled across the battery cell and a thermistor positioned to measure a temperature of the battery cell, wherein the fault detection signal is generated in response to one or more of an overvoltage condition, undervoltage condition, overtemperature condition, loss of communication with another module controller, loss of communication with the pack controller, and failure of the module controller processor.

15. The module controller of claim 9 wherein the downstream electro-optical transmitter is configured to convert an electrical resume signal into an optical resume signal for transmitting to the pack controller, the safety fault detection circuitry is further configured to cease generating the fault detection signal once the safety fault ceases, and the safety override circuitry is further configured to transmit the electrical resume signal to the downstream electro-optical transmitter once the fault detection signal ceases.

16. The module controller of claim 15 wherein the optical safety signal and the optical resume signal are identical.

17. The module controller of claim 15 further comprising a second downstream electro-optical transceiver for receiving optical message data from and transmitting the optical message data to the pack controller, wherein the second downstream electro-optical transceiver is configured to convert between the optical message data and electrical message data, and wherein the signal generation circuitry and signal processing circuitry further comprise:

(a) the module controller processor communicatively coupled to the second downstream electro-optical transceiver and to the downstream electro-optical receiver; and (b) the module controller memory communicatively coupled to the module controller processor, the module controller memory having stored thereon computer program code executable by the module controller processor to cause the module controller processor to use, when the battery module is experiencing the safety fault, the second downstream electro-optical transceiver to receive and transmit the optical message data from and to the pack controller by receiving and transmitting the electrical message data from and to the second downstream electro-optical transceiver, respectively.

18. A module controller comprising part of a battery module, the module controller comprising:

(A) a first electro-optical transmitter for receiving a transmitted electrical signal and configured to convert the transmitted electrical signal into a transmitted optical signal;

(B) signal generation circuitry communicatively coupled to the first electro-optical transmitter and configured to generate the transmitted electrical signal;

(C) signal processing circuitry configured to process a received electrical signal; and (D) a first electro-optical receiver for receiving a received optical signal from a pack controller and configured to convert the received optical signal into a received electrical signal for processing by the signal processing circuitry, wherein:

(a) the received signal comprises an optical safety signal from the pack controller and the first electro-optical receiver is configured to convert the optical safety signal into an electrical safety signal;

(b) the transmitted signal comprises an optical safety fault signal and the first electro-optical transmitter is configured to convert an electrical safety fault signal into the optical safety fault signal; and (c) the signal generation circuitry and signal processing circuitry comprise:

(i) safety fault detection circuitry configured to generate a fault detection signal in response to detecting a safety fault on the battery module; and (ii) safety override circuitry communicatively coupled to the first electro-optical receiver, first electro-optical transmitter, and safety fault detection circuitry, wherein the safety override circuitry is configured to transmit the electrical safety fault signal to the first electro-optical transmitter in response to the fault detection signal, and wherein the safety fault detection circuitry comprises:

(a) a first interlock contact to which a power connector is connectable, wherein the power connector is also connected to a pair of battery contacts electrically coupled to a battery cell comprising part of the battery module when connected to the first interlock contact and is unconnected to the pair of battery contacts when unconnected to the first interlock contact; and (b) an interlock signal line communicatively coupled to the first interlock contact, wherein the fault detection signal is transmitted along the interlock signal line when the power connector is unconnected and is otherwise not transmitted along the interlock signal line.

* * * * *